(12) United States Patent
Hermesh et al.

(10) Patent No.: US 11,172,054 B2
(45) Date of Patent: Nov. 9, 2021

(54) CROSS-DEVICE SEGMENTATION OFFLOAD

(71) Applicant: Intel Corporation, Santa Clara, CA (US)

(72) Inventors: Barak Hermesh, Pardes Hana (IL); Avi Priev, Petach-Tikva (IL); Ziv Kfir, Yavne (IL); Artur Zaks, Modiin (IL)

(73) Assignee: MaxLinear, Inc., Carlsbad, CA (US)

( * ) Notice: Subject to any disclaimer, the term of this patent is extended or adjusted under 35 U.S.C. 154(b) by 209 days.

(21) Appl. No.: 16/466,087

(22) PCT Filed: Jan. 3, 2017

(86) PCT No.: PCT/US2017/012051
§ 371 (c)(1),
(2) Date: Jun. 3, 2019

(87) PCT Pub. No.: WO2018/128597
PCT Pub. Date: Jul. 12, 2018

(65) Prior Publication Data
US 2020/0068048 A1   Feb. 27, 2020

(51) Int. Cl.
*H04L 29/06* (2006.01)
(52) U.S. Cl.
CPC ...... *H04L 69/161* (2013.01); *H04L 29/06095* (2013.01); *H04L 69/166* (2013.01); *H04L 69/22* (2013.01)
(58) Field of Classification Search
CPC ............. H04L 69/161; H04L 29/06095; H04L 69/166; H04L 69/22
See application file for complete search history.

(56) References Cited

U.S. PATENT DOCUMENTS 9,210,094 B1   12/2015 Warren et al.
9,723,112 B1 *  8/2017 Kozlovsky ............ H04L 69/326
(Continued)

FOREIGN PATENT DOCUMENTS

WO   2015/038836 A2   3/2015

OTHER PUBLICATIONS

International Search Report and Written Opinion dated Nov. 8, 2017 for PCT Application PCT/US2017/012051.
(Continued)

*Primary Examiner* — Kiet Tang
(74) *Attorney, Agent, or Firm* — Maschoff Brennan

(57) ABSTRACT

This disclosure relates to offloading processing intensive tasks in communication protocol specific operations off the device, e.g. to another network node connected to the device via a network. Such tasks may for example include flow control, segmentation/desegmentation, and/or error control. As part of error control, protocols of the transport protocol layer of the OSI protocol stack may include checksum calculation to ensure reliability of the (payload) data. The calculation of checksums may be processing intensive. For this reason, example client nodes that realize the offloading of processing intensive tasks in communication protocol specific operations to another network node may not utilize any transport layer protocol at all, but rely on flow control and error control implemented in most modern data link layer protocols (Layer 2 of the OSI protocol stack). Accordingly, the processing intensive tasks can be "shifted" from the client device to another device.

23 Claims, 14 Drawing Sheets

(56) References Cited

U.S. PATENT DOCUMENTS

| | | | |
|---|---|---|---|
| 2004/0146054 A1* | 7/2004 | Golshan | H04L 67/1097 370/395.52 |
| 2007/0047547 A1* | 3/2007 | Conner | H04L 49/90 370/392 |
| 2007/0130352 A1 | 6/2007 | Chhabra et al. | |
| 2007/0153797 A1* | 7/2007 | Connor | H04L 69/166 370/392 |
| 2007/0177608 A1* | 8/2007 | Ding | H04L 69/22 370/395.6 |
| 2010/0260129 A1* | 10/2010 | Ulupinar | H04W 28/06 370/329 |
| 2012/0082161 A1* | 4/2012 | Leung | H04L 12/4633 370/392 |

OTHER PUBLICATIONS

"Transmission Control Protocol, Darpa Internet Program, Protocol Specification." University of Southern California. Sep. 1, 1981. 89 pages.

* cited by examiner

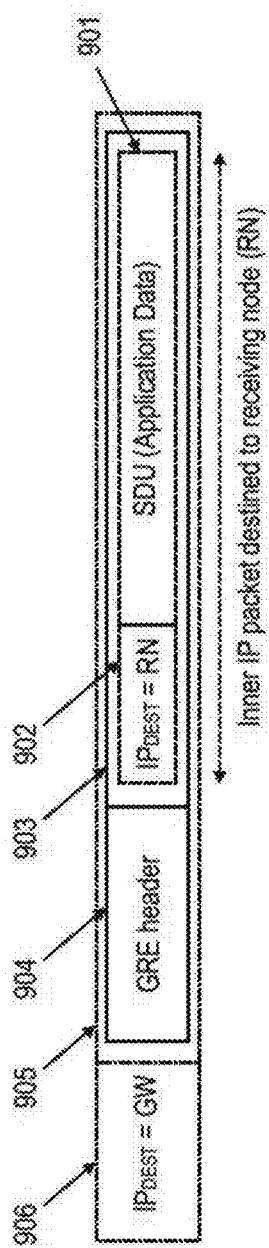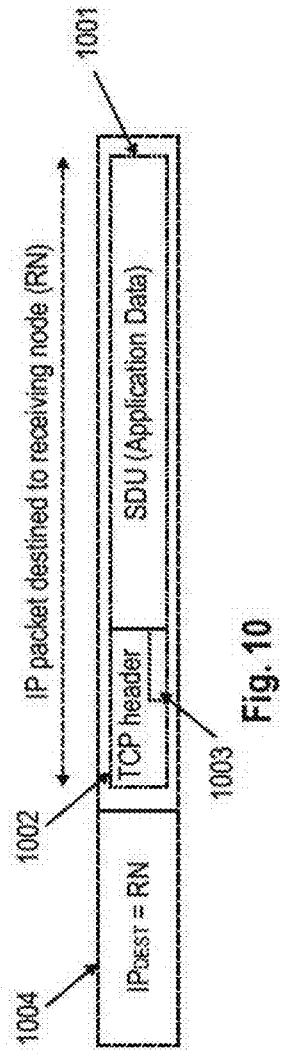
Fig. 9
Fig. 10

CROSS-DEVICE SEGMENTATION OFFLOAD

This application is a National Phase entry application of International Patent Application No. PCT/US2017/012051 filed Jan. 3, 2017, entitled "CROSS-DEVICE SEGMENTATION OFFLOAD" in the name of Barak Hermesh et al. and is hereby incorporated by reference in its entirety.

TECHNICAL FIELD

This disclosure generally relates to offloading the segmentation of packets in a protocol layer from a client node to a network node, which may be a gateway in some example implementations. The disclosure inter alia provides apparatuses, methods, computer-readable media, and message structures to realize the segmentation offload.

BACKGROUND

Rapidly growing video and streaming data content usage by mobile/Internet-of-Things (IoT) clients persistently challenge existing networking access efficiency. This challenge may become even more critical for highly competitive edge network access solutions (e.g. residential home/small office gateways). Existing edge access solutions may support some network offloading techniques (for example, TCP Segmentation Offload (TSO), UDP Fragmentation Offload (UDP), Large Receive Offload (LRO), Generic Segmentation Offload (GSO)).

Taking TSO as an example, TSO enabled clients may have higher transmission performance with same CPU load when sending packets exceeding the defined TCP Maximum Transmission Unit (MTU)/Maximum Segment Size (MSS) from the operating system (OS) network stack. The network interface card (NIC) in the client may implement the TCP layer and lower layers of the protocol stack and "oversized packets" may split by the NIC hardware. For example, a TCP service data unit (SDU) of 64 kB (65,536 bytes) of data may conventionally be segmented by the TCP protocol in the OS protocol stack into 46 segments of 1448 bytes each before it is sent through the NIC and over the network. With some intelligence in the NIC, the host CPU can hand over the 64 KB SDU to the NIC in a single transmit-request. The NIC will then break the 64 KB SDU down into smaller segments of 1448 bytes, add the TCP, IP, and data link layer protocol headers to each segment, and send the resulting frames over the network.

This allows to move computation extensive and thus CPU extensive tasks, such as context switching, check-sum calculation and expensive per packet headers creation, from an OS implementation of the protocol stack (running on the host CPU) to a corresponding protocol stack implementation the NIC's hardware and computation resources. However, segmentation offload benefits are limited to a single network node.

BRIEF DESCRIPTION OF THE DRAWINGS

The various embodiments of this disclosure will be readily understood by the following detailed description in conjunction with the accompanying drawings. To facilitate this description, like reference numerals designate like elements. Embodiments are illustrated by way of example and not by way of limitation in the figures of the accompanying drawings.

FIG. 9 shows an example IP packet that is passed by the GRE protocol 802 shown in FIG. 8 to the data link layer 706 in the protocol stack of the client device;

FIG. 10 shows an example IP packet that is passed by the IP protocol 804 shown in FIG. 8 to the data link layer 710 in the transmission protocol stack of the network node;

DETAILED DESCRIPTION

Figure 1:
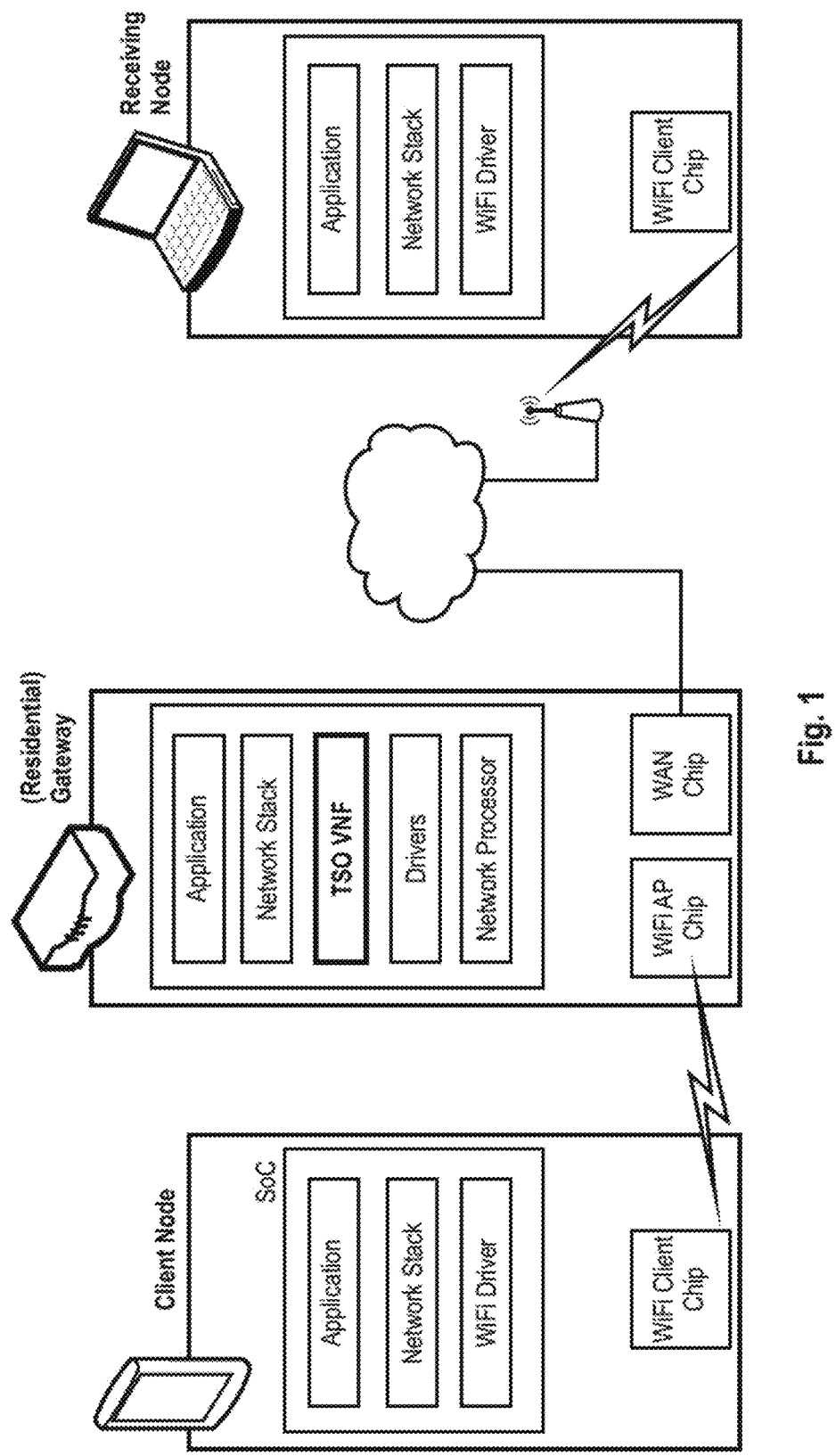
FIG. 1 shows an exemplary communication between a client node and a receiving node via a (residential) gateway in the client node's local access network (LAN) and an service provider's a wide area network (WAN), where processing intensive tasks are offloaded by the client node to the gateway.

The significant increase in the utilization of networks due to amount data streaming data content is a becoming a significant challenge for mobile client (e.g. Internet-of- Things (IoT) clients). Considering example applications like multi-room digital video recorder (DVR), High-Definition Television (HDTV) and Ultra-High Definition (UHD) video distribution, gaming and HD/UHD and live streaming have high demands on the network throughputs, but also may be a challenge for (thin) clients in terms of processing power (and related power/battery consumption). One example technology, which deals with the networking aspect is MoCA which is short for Multimedia over Coax Alliance. MoCA is an industry standard alliance (see http://www.mocalliance.org) developing technology for the connected home. Yet, MoCA does not address the above issues related to processor utilization and power consumption.

As a rule of thumb, one can assume that 1 Hertz of CPU processing power is required to send or receive 1 bit/s of TCP/IP traffic. According to his rule 1 Gbit/s (125 MB/s) of network traffic requires 1 GHz of CPU processing power. This implies that in clients with lower clock frequencies in the few GHz range (or below), the processing of TCP/IP traffic might easily consume 50% of the available CPU time (and power consumption). As noted above, TSO may free some of the CPU time, by shifting diverting parts of the processing of the TCP/IP stack towards the network interface hardware (e.g. to the Ethernet chipset, WiFi chipset, 3G/4G/5G chipset, etc.). Although this may free CPU time on processor running the OS, still this might not (significantly) reduce the power consumption in the device.

Aspects of this disclosure relate to offloading processing intensive tasks in communication protocol specific operations off the device, e.g. to another network node connected to the device via a network. Such tasks may for example include flow control, segmentation/desegmentation, and/or error control. As part of error control, protocols of the transport protocol layer of the OSI protocol stack (also referred to as Layer 4) may include checksum calculation to ensure reliability of the (payload) data. The calculation of checksums may be processing intensive. Transport layer protocols may perform the checksum calculation based on the entire network layer service data unit (SDU)—i.e. the payload data received from the next higher protocol in the protocol stack—or sometimes the network layer protocol data unit (PDU)—i.e. the SDU and any additional encapsulation information, e.g. header, added by the (network) layer.

For this reason, example client nodes that realize the offloading of processing intensive tasks in communication protocol specific operations to another network node may not utilize any transport layer protocol at all (or may not utilize any transport layer protocol imposing significant utilization of processing power in the client node), but rely on flow control (e.g. using Automatic Repeat Request (ARQ)) and error control (e.g. by means of Cyclic Redundancy Check (CRC) bits) implemented in most modern data link layer protocols (Layer 2 of the OSI protocol stack). For example, the access stratum of 3PP-based communication standards (e.g. Universal Mobile Telecommunications System (UMTS), Long Term Evolution (LTE), LTE Advanced, LTE Advanced Pro, etc.) and IEEE-based communication standards (e.g. the IEEE 802.11 standards family (WiFi)) implement flow control and error control in Layer 2 (e.g. Radio Link Control (RLC), Medium Access Control (MAC) layer, Logical Link Control (LLC), etc.). Accordingly, the processing intensive tasks, such as flow control, segmentation/desegmentation, and/or error control can be "shifted" from the client device to another device (e.g. a gateway in the network or a node in the service provider's wide area network (WAN)).

Any of the operations, processes, etc. described herein may be implemented as computer-readable instructions stored on a computer-readable medium. The computer-readable instructions may, for example, be executed by a processor of a mobile unit, a network element, and/or any other computing device.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing devices, such as processors, CPUs and the like.

Figure 3:
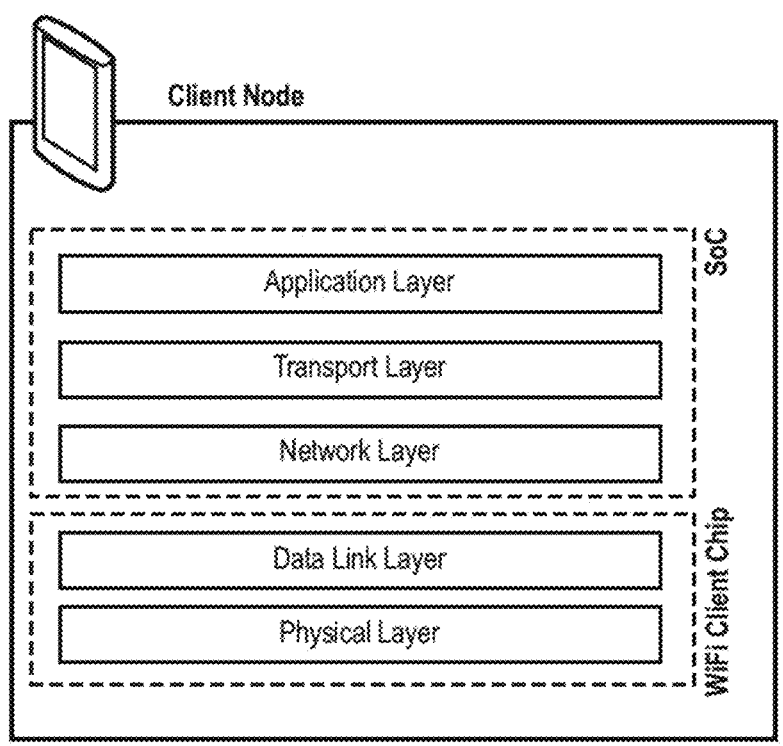
FIG. 3 shows a functional split of the protocol stack between operating system (OS) and a WiFi chipset in a client node.

FIG. 1 shows an exemplary network in which a client node may reside in a WiFi network at home, and may be connected to the WAN of a service provider via a gateway (GW). The client node is in communication with a receiving node, which is reached via the WAN in another WiFi network. The client node may however also communicate with another client node within the local network, without traversing a WAN. The client node may be for example a wireless device, e.g. a smartphone, tablet, laptop, etc. but this disclosure is not limited to these types of clients only. The operating system (OS) of the client device may be running on a System-on-a-Chip (SoC). The OS of the network node may include a WiFi driver for ensuring data exchange with a WiFi chipset providing wireless network connectivity. The client node may implement a network stack for communication. In conventional examples, as shown in FIG. 3, it may be assumed that the WiFi chipset implements the physical layer (Layer 1) and data link layer (Layer 2) of the OSI protocol stack, and that network layer (Layer 3), transport layer (Layer 4) and other higher layer (Layer 5, 6 and 7) of the OSI protocol stack may be implemented by the OS. The client node may use this kind of functional split for communication via the network when not offloading processing intensive tasks in communication protocol specific operations to the gateway.

Figure 4:
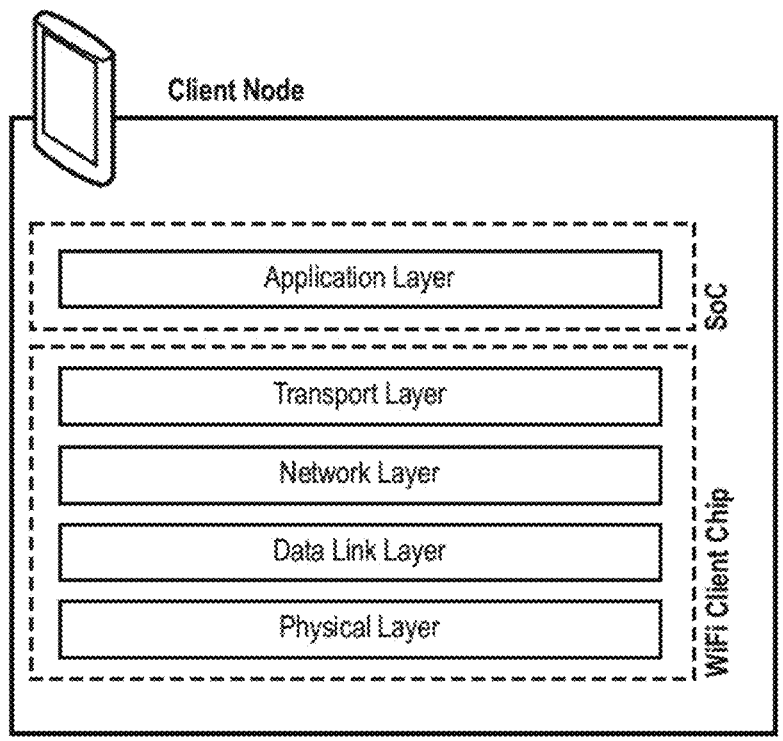
FIG. 4 shows an alternative functional split of the protocol stack between operating system (OS) and a WiFi chipset in a client node.

Another example of a functional split of the protocol stack is shown in FIG. 3. In this example, the WiFi chipset of the client may also implement the network layer and optionally also the transport layer. This would allow the application layer (here comprising OSI Layers 5, 6 and 7 and thus corresponding to the "application layer" in the Internet protocol suite) run by the OS on the SoC to directly interface with WiFi chipset. The OS of the client devices may be able to decide, e.g. for each application, whether the traditional functional split of the protocol stack as shown in FIG. 3 or the functional split of the protocol stack as shown in FIG. 4 is used.

In off-device offloading of processing intensive tasks, the gateway may implement the offloaded functionality. As the gateway may handle offloaded functionality of multiple clients at the same time, each client offloading tasks to the gateway may be assigned a virtual network function (VNF) that is performing the offloaded tasks. In the example of FIG.

1, as indicated by the block "TSO VNF", the client device offloads the TCP segmentation (and related flow control and error control) to the gateway. The example and this disclosure in general is however not limited to such "off-client" TSO, but the concepts may be applied generally to offloading any protocol layer function above the data link layer (Layer 2), e.g. in the transport protocol layer, which imposes processing intensive tasks (such as for example flow control, segmentation/desegmentation, and/or error control).

As noted, the gateway may act as a WiFi access point (AP) providing the home network using its WiFi chipset. The gateway may also provide an interface to the WAN and may thus include a WAN chipset. The gateway functions similar to a traditional gateway as regards the implementation of the physical layer, data link layer in the present example. The enhancements to such traditional gateway functionality will be explained in the following in further detail.

Figure 2:
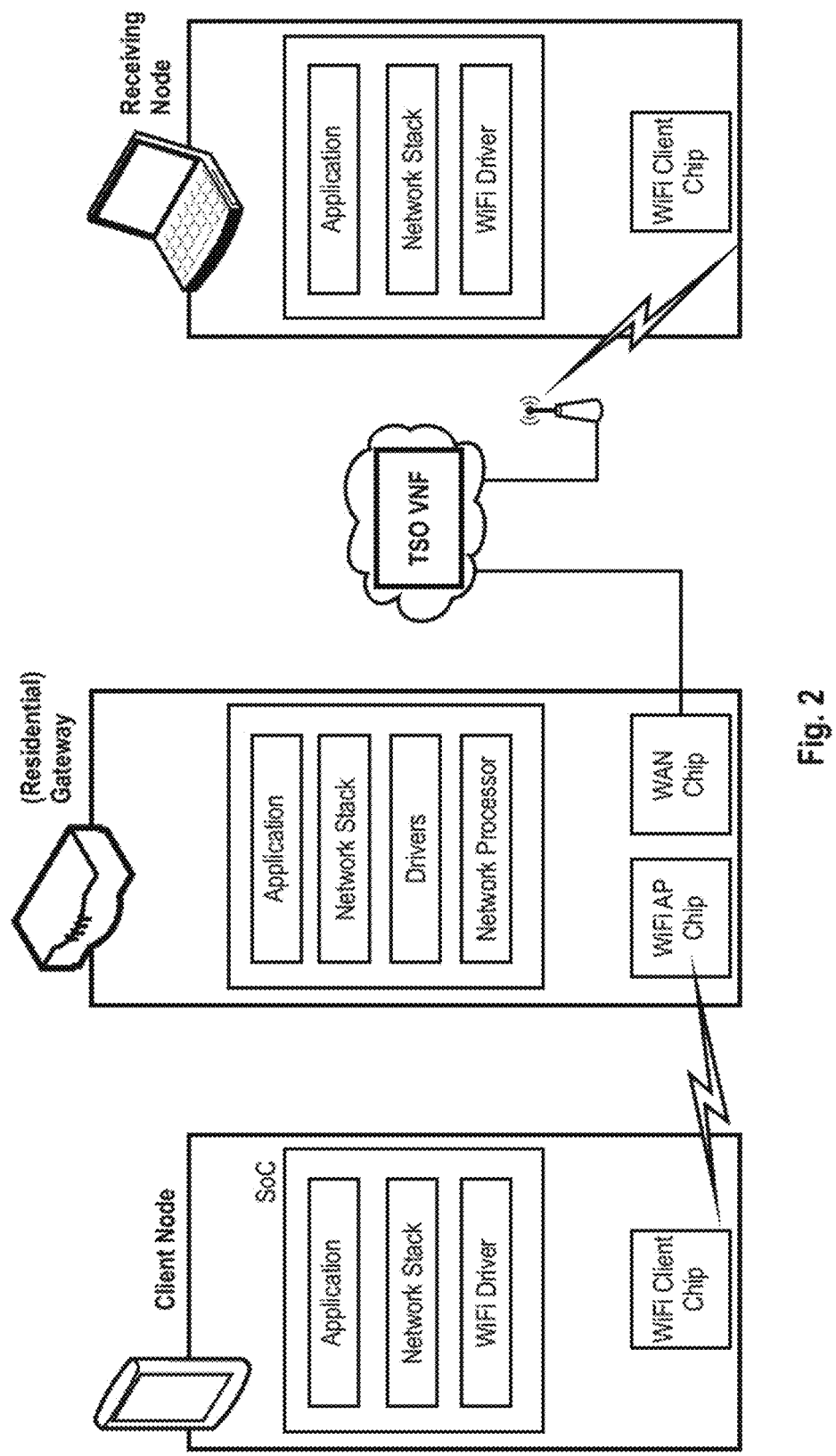
FIG. 2 shows an exemplary communication between a client node and a receiving node via a (residential) gateway in the client node's local access network (LAN) and an service provider's a wide area network (WAN), where processing intensive tasks are offloaded by the client node to a node in the WAN.

As shown in FIG. 2, the offload of client functionality may also relocate the functionality to another node than a (home) gateway, deeper into the provider network. For example, the entire or part of the functionality of the network layer and/or the transport layer could also be offloaded to a node in the server provider network (e.g. in network function virtualization (NFV) infrastructure implemented in the Data Center deployed in service provider network). In this example, it is assumed that the different data link layer(s) in potentially different access technologies used between the client node and the offload node in the provider network provide flow control and error control, so that reliability of the packet delivery can be assumed even when not utilizing any transport layer protocol between the client node and offload node at all (or when not utilizing any transport layer protocol imposing significant utilization of processing power in the client node). Hence, even though most examples herein make reference to a (home) gateway in a local area network (LAN) as the offload node, these examples could also be realized using another offload node in the WAN.

Figure 5:
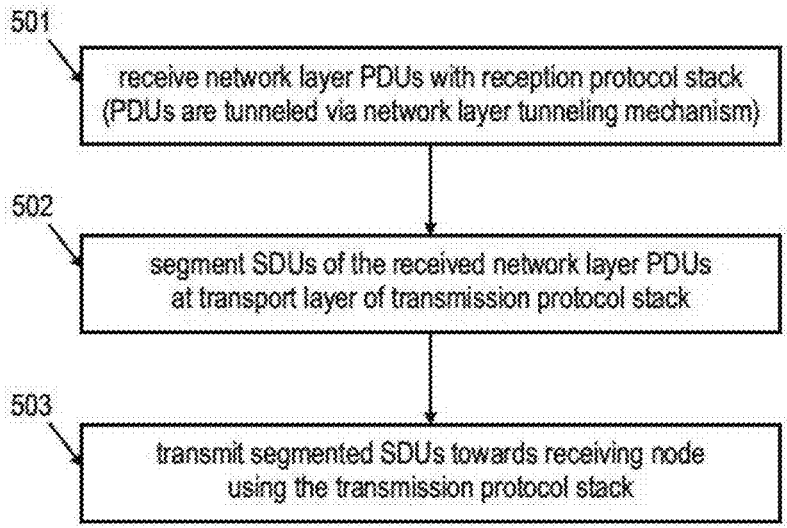
FIG. 5 shows a flow chart of a process of forwarding data received from a client node to a receiving node by a network node implementing the offloaded functionality in said forwarding.

An example operation of the gateway is shown in the flow chart of FIG. 5. As noted, in the example it is assumed—without losing generality—that a gateway is to perform segmentation on behalf of a transmitting node (for example a client device as shown in FIG. 1). The gateway may comprise a processor and memory. The memory may store instructions that when executed by the processor cause the gateway to provide a reception protocol stack and a transmission protocols stack that have the following functionality. It should be noted that the terms "reception protocol stack" and "transmission protocol stack" are used to distinguish the two stacks from each other.

The reception protocol stack may be configured to receive 501 network layer packet data units (PDUs) from the transmitting node. Each of the PDUs includes a transport layer service data unit (SDU) that encapsulates application data. Further, in this example, the PDUs are the devoid of a transport layer header facilitating reliability of the data delivery between the gateway and the transmitting node. Accordingly, the PDUs may be formed by the transmitting device without requiring any processing related to ensuring reliability of the data delivery, such as error control (e.g. calculation of checksums), and/or may not require resource utilization at the transmitting node for flow control (e.g. ARQ processing, including tracking ACK/NACK, controlling and updating transmission windows, sending retransmissions, and/or forming redundancy versions, etc.) that would be otherwise required in the transport layer.

The transmission protocol stack includes a transport layer having a transport layer protocol that segments the SDUs into segments 502 and adds a transport layer header to the segments prior to their transmission to the receiving node. The transport layer header (respectively, the protocol information added to the SDU by the transport layer protocol in the transmission protocol stack) may for example include information to ensure the reliability of the transmissions of the SDU data between the gateway and the receiving node. In one example, each of the PDUs formed by the transport layer protocol of the transmission protocol stack may include a checksum that is calculated by the gateway based on the SDU segment transported by the respective PDU and optionally further the transport layer header. The checksum may allow to confirm at the receiving end whether the information (bits) of the SDU segment transported by the respective PDU and optionally further the transport layer header have been correctly restored at the receiving end.

The PDUs formed by the transport layer protocol of the transmission protocol stack are then transmitted 503 from the gateway towards the receiving node.

Figure 6:
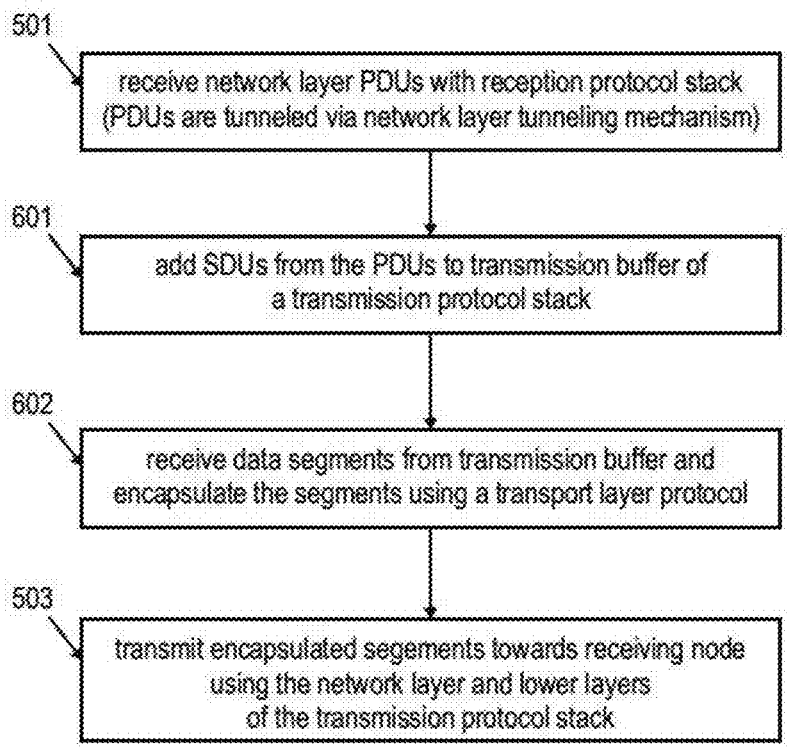
FIG. 6 shows a flow chart of a more detailed process of forwarding data received from a client node to a receiving node by a network node implementing the offloaded functionality in said forwarding.

Another further example of the gateway's operations is shown in the flow chart of FIG. 6. As in FIG. 5, the reception protocol stack may be configured to receive 501 network layer PDUs from the transmitting node. Each of the PDUs includes a transport layer SDU that encapsulates application data. Further, in this example, the PDUs are the devoid of a transport layer header facilitating reliability of the data delivery between the gateway and the transmitting node. For example using its processor, the gateway may further add 601 the SDUs into a transmission buffer of a protocol in the transport layer of the transmission protocol stack. The transport layer protocol segments the SDUs in the transmission buffer by the transport layer protocol in the transmission protocol stack receiving 602 individual segments of data of the SDU from the transmission buffer. Those segments are then encapsulated by the transport layer protocol in the transmission protocol stack as examined above in connection with FIG. 5 and are transmitted 503 by the gateway towards the receiving node using the transport layer protocol and the lower layers of the transmission protocol stack.

In the above described examples related to FIGS. 5 and 6, the network layer PDUs received at the gateway from the transmitting node may not use a transport layer protocol, as noted above, so that the network layer of the transmitting node may not have to implement functionality such as segmentation at the network layer. Accordingly, the network layer at the client sending the PDUs may not need to enforce a MTU/MSS size that may be conventionally defined by a given transport layer protocol. Therefore, the size of the SDUs received via the reception protocol stack of the gateway may be larger than the MTU/MSS size of the transport layer protocol in the transmission protocol stack implemented in the gateway. As noted, segmentation and potential further functionality for ensuring reliability and/or flow control may be thus offloaded from the transmitting node to the gateway.

As noted previously, in both examples of FIGS. 5 and 6, the data link layer of the reception protocol stack of the gateway may ensure reliability by implementing an automatic repeat request mechanism.

Figure 7:
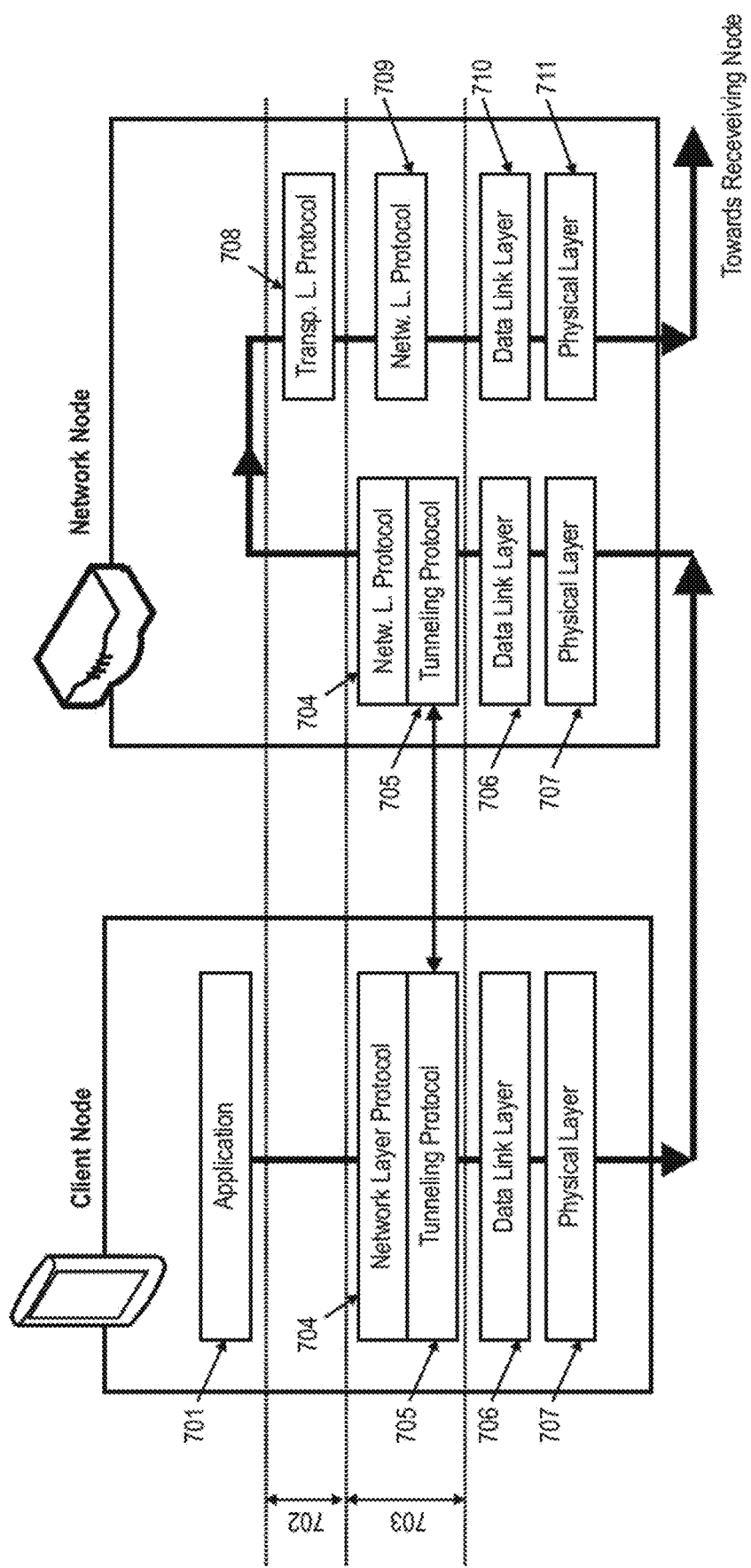
FIG. 7 shows an example process of forwarding data received from a client node to a receiving node by a network node implementing the offloaded functionality in said forwarding.

Next, a more detailed example of the flow and transmission of application data from an example client device (as the transmitting node) via a network node (e.g. the gateway) to a receiving node (not shown) will be described in connection with FIG. 7 in more detail. As shown on the left hand side of FIG. 7, the application layer 701 (here comprising OSI Layers 5, 6 and 7 and thus corresponding to the "application layer" in the Internet protocol suite) provides them from the application layer 701 directly to the network layer 703 (i.e. without using any transport layer protocol/processing of the application data in the transport layer 702). For example, the application data may be directly provided to a transmission buffer of the network layer protocol 704. In the network layer 703, the application data are received by a network layer protocol 704 in form of SDUs. The network layer protocol 704 encapsulates each SDU by adding a network layer protocol header to the SDU, thereby forming PDU. The network layer protocol header may comprise a destination address, which indicates the network layer address of the receiving node. The network layer protocol header may comprise a source address, which may be the client device's network layer address.

The PDUs of the network layer protocol are then provided as SDUs to a tunneling protocol 705 of the client device's transmission protocol stack. The tunneling protocol 705 is referred to as a "network layer tunneling protocol" as it redirects the network layer protocol's PDUs addressed to the network address of the receiving node to another network layer address, i.e. the network layer address of the network node. In an example implementation, the network layer address of the network node may be a network address assigned to a virtual network function provided by the network node to implement the offloaded functionality on behalf of the client device. Therefore, the tunneling protocol 705 is also considered part of the network layer 703 in this example. The tunneling protocol 705 adds a tunneling header to each SDUs (i.e. the PDUs of the network layer protocol 704) and encapsulates each tuple of tunneling header and SDU by adding another header including at least the network layer address of the network node. The resulting data packet is sent as a tunneling protocol PDU via the lower layers (data link layer 706 and physical layer 707) to the network node.

The network node receives the data packet via its physical layer 707 data link layer 706 and provides them to the tunneling protocol 705 in the network layer 703. The tunneling protocol 705 in the reception protocol stack of the network node removes the outer network layer address header including the network layer address of the network node, as well as the tunneling header to obtain the SDUs, i.e. the PDUs of the network layer protocol 704, and passes them to the network layer protocol 704. The network layer protocol 704 obtains the application data from the network layer protocol PDUs and stores them in a transmission buffer of the transport layer protocol 708 in the transport layer 702 of transmission protocol stack of the network node. The transport layer protocol 708 may for example comprise functionality such as flow control and/or error control. Furthermore, the transport layer protocol 708 may provide segmentation, for example in order to enforce a predetermined MTU/MSS size on the transport layer connection with the receiving node.

The transport layer protocol 708 may receive segments of the application data (application layer SDUs) from the transmission buffer and may add transport layer protocol header information to the SDUs so as to form a transport layer PDUs. The transport layer protocol header may include a checksum calculated by the network node based on at least the respective application layer SDU for ensuring reliability. The transport layer PDUs are then passed to the network layer 703 as network layer SDUs where a network layer protocol 709 adds its header to the network layer SDU. This header includes, as a destination address, a network layer address of the receiving node. Further, the so formed network layer PDUs are transmitted towards the receiving node via the lower layers (data link layer 710 and physical layer 711) of the network node's transmission protocol stack.

Figure 8:
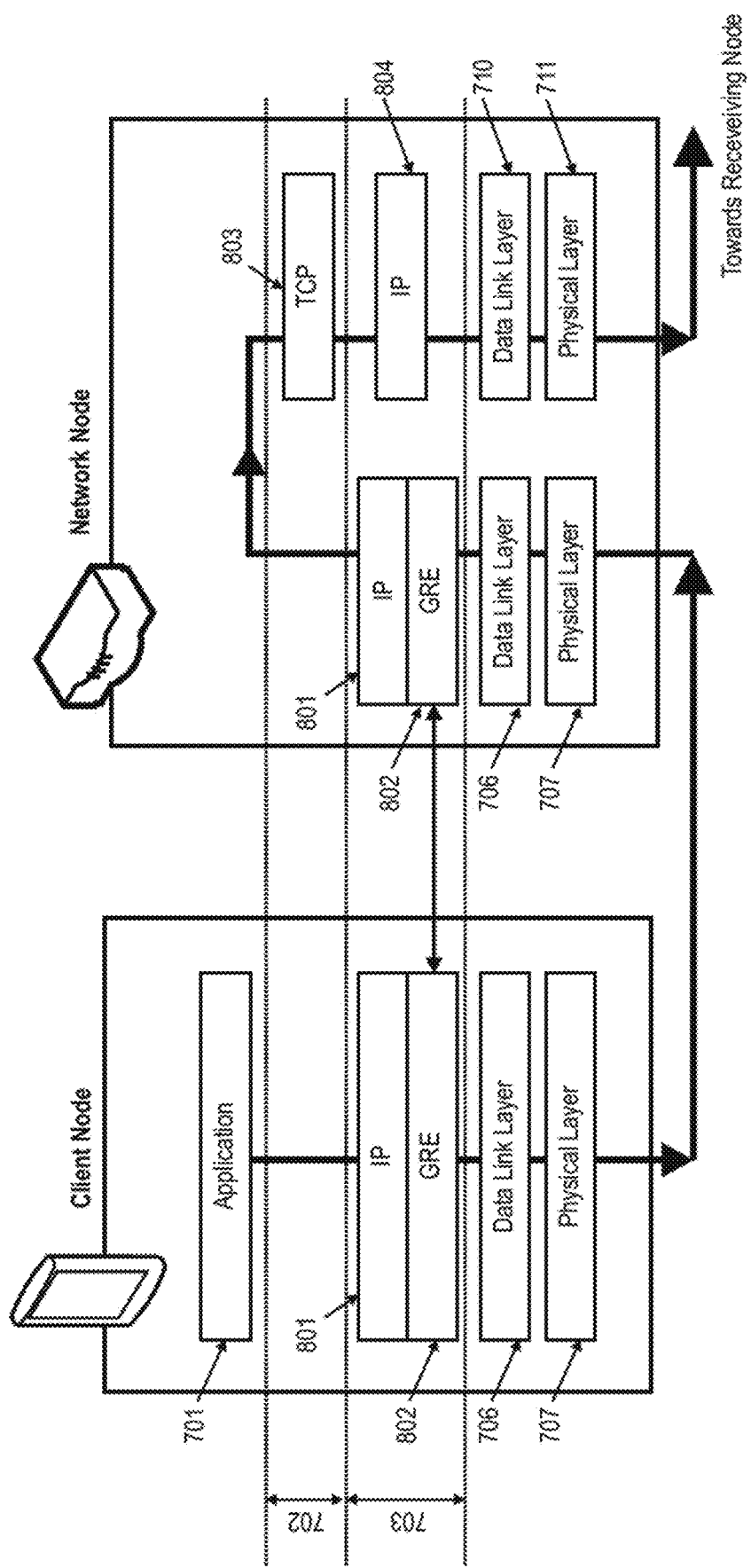
FIG. 8 shows an example implementation of the process of FIG. 7.

A more detailed exemplary implementation of the flow and transmission of application data from the client device via a network node to a receiving node (not shown) discussed in connection with FIG. 7 will now be outlined in connection with FIG. 8. In FIG. 8 it is assumed that the transport layer 702 for the transmission of the application data from the client device to the receiving node should be implemented by the Transmission Control Protocol (TCP) protocol. However, the client device "offloads" the TCP PDU and header generation (typically imposing a MTU/MSS size of approx. 1.500 bytes and including inter alia a checksum calculation for each segment) to the network node in this example. The network layer 703 in the protocol stack between client device and network node is implemented using the IPv4 (or alternatively IPv6) protocol 801 as the network layer protocol 704 and the Generic Routing Encapsulation (GRE) 802 as the tunneling protocol 705. Similarly, in the transmission protocol stack of the network node, the transport layer 702 is implemented by the TCP protocol 803 (due to offloading) and the network layer 703 is implemented by the IPv4 (or alternatively IPv6) protocol 804.

FIG. 9 shows an example IP packet that is passed by the GRE protocol 802 to the data link layer 706 in the protocol stack of the client device. As noted in connection with FIG. 7 and indicated in FIG. 8, the IP protocol 801 will encapsulate each received the application layer SDU 901 with an IP header 902 which includes the receiving node's IP address ($IP_{DEST}$=RN) as the destination address. The source address of the IP header may indicate the IP address of the client device. The IP packets 903 from the IP protocol 801 are then passed to the GRE protocol 802, which adds the GRE header information 904 to the inner IP packet 903 to for the SDU 905 for an outer IP header 906 that will redirect (tunnel) the inner IP packet 903 to the network node. The outer IP header 906 includes an IP destination address set to the IP address of the network node ($IP_{DEST}$=GW) or an IP address associated with a virtual network function in the network node that implements the offloaded TCP functionality (as will be outlined in more detail below).

The tunneled IP packet 905, 906 will be received at the GRE protocol 802 of the reception protocol stack of the network node, which decapsulates the inner IP packet 903 and provides the inner IP packet 903 to the IP protocol 801 of the reception protocol stack of the network node. The IP header 902 of the inner protocol packet 903 is stripped off and the SDU (containing the application data is added to the transmission buffer of the TCP protocol 803 of the of the transmission protocol stack of the network node.

As shown in FIG. 10, the TCP protocol 803 will received individual segments (SDU 1001) of the application data from the transmission buffer and adds a TCP header 1002 to the SDU to form a TCP packet (TCP PDU). Notably, the TCP header 1002 includes a checksum 1003 which is calculated on the SDU 1001 and a "pseudo header" as defined in RFC 793, "Transmission Control Protocol", 1981 or RFC 2460, "Internet Protocol, Version 6 (IPv6) Specification", 1998. The segment size of the SDUs obtained from the transmission buffer may be determined using the Path MTU Discovery as for example defined in RFC 1191, "Path MTU Discovery", 1990 or RFC 1981, "Path MTU Discovery for IP version 6", 1996.

The TCP packets formed by the TCP protocol 803 are then passed to the IP protocol 804 in the transmission protocol stack of the network node. The IP protocol 804 adds an IP header 1004 to the respective TCP packets 1001, 1002 and transmits the IP packets via the data link layer 710 and physical layer 711 in the transmission protocol stack of the network node.

Although the above example uses GRE 802 as a network layer tunneling protocols, please note that also other tunneling protocols, such as for example the GPRS Tunneling Protocol (GTP), the Point-to-Point Tunneling Protocol (PPTP), or the Layer 2 Tunneling Protocol (L2TP) could be used instead. Similarly, the transport protocol 708 in the transmission protocol stack of the network node is not limited to the TCP protocol 804. Alternatively, the transport protocol 708 may be implemented by the User Datagram Protocol (UDP), the Datagram Congestion Control Protocol (DCCP) or the Stream Control Transmission Protocol (SCTP). Furthermore, as noted above, the network layer in the transmission protocol stack and/or the reception protocol stack can be the Internet Protocol (IP) either in version 4 or version 6.

Figure 11:
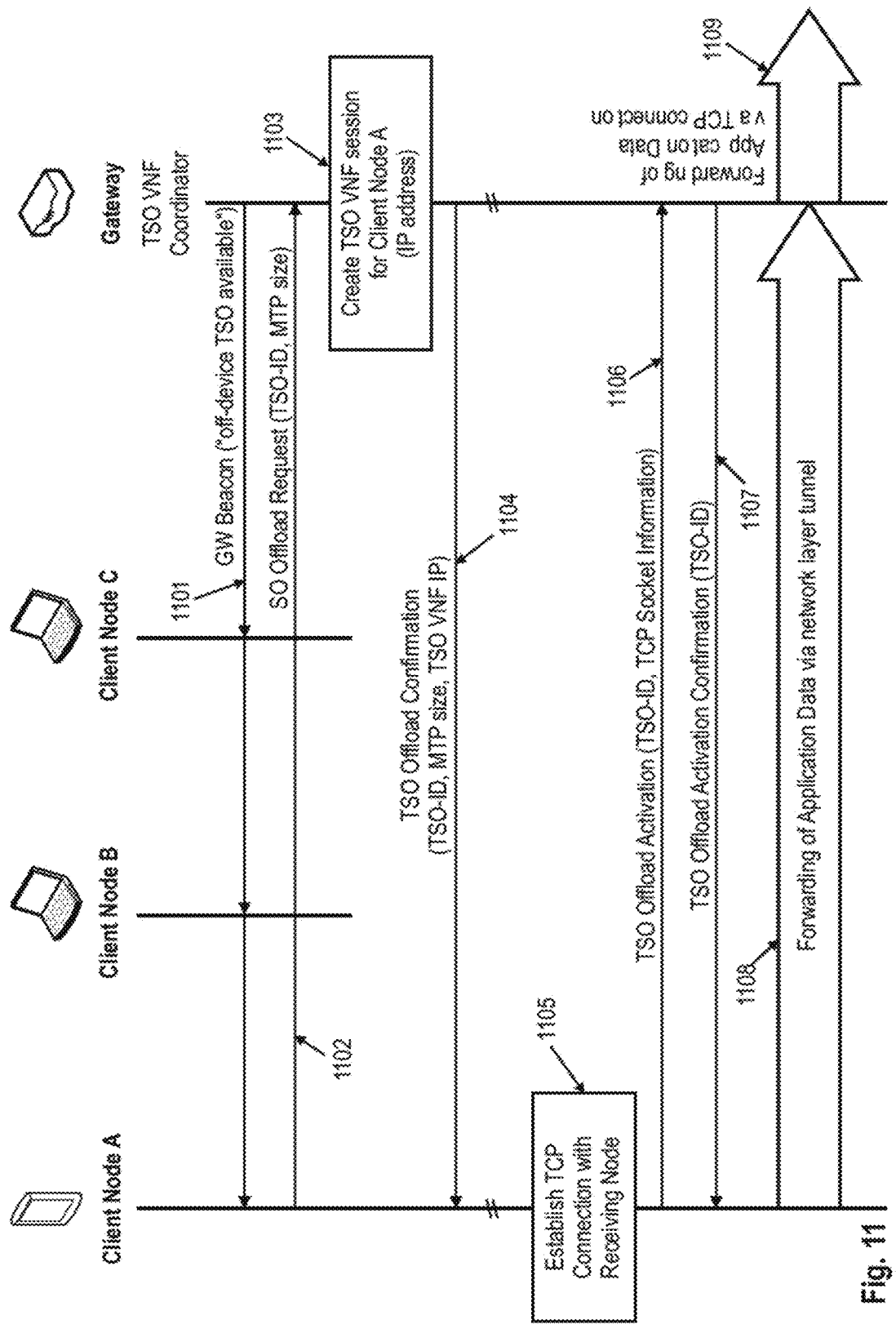
FIG. 11 shows an example process of a client node A discovering a gateway to provide off-device segmentation offloading and registering for off-device segmentation offloading at the gateway.

FIG. 11 shows an example process of a client node A discovering a gateway to provide off-device segmentation offloading and registering for off-device segmentation offloading at the gateway. The gateway may implement a Network Offloading Engine (NOE). The NOE may be thought to represent an engine that gathers various network offloading related context inputs, implements a control over the NOE elements (virtual network functions) and coordinates collective gateway-clients system based capabilities. Notably, the NOE may also be implemented in a client node.

The NOE may comprise a NOE Controller (VNF Coordinator). The NOE Controller may be realized by means of a programmable logic that implements initial detection of available off-device offload-capable client devices in proximity. As exemplarily shown in FIG. 11, the NOE Controller (VNF Coordinator) may reside in a gateway that may for example also function as a WiFi access point (AP). The NOE Controller (VNF Coordinator) may cause the gateway to transmit 1101 (e.g. broadcast) some indication (e.g. as part of a beacon signal or broadcast system information) that the gateway facilitates off-device offloading of processing intensive tasks, such as for example providing an "off-device TSO" functionality as described in connection with FIGS. 7 to 10 above.

Client nodes receiving the indication and capable of using off-device offloading (e.g. Client Node A) will understand the indication and may register for off-device offloading. For example, the client node A responds to the detection of the indication in the gateway beacon 1101 by sending a TSO Offload Request 1102 to the gateway to register for the use of the "off-device TSO" functionality provided by the gateway. The TSO Offload Request 1102 is provided for processing to the NOE Controller (VNF Coordinator). The TSO Offload Request 1102 (as well as the other control messages 1104, 1106, and 1107) may be for example sent (received) by a control function or control protocol that resides in the application layer (e.g. one of OSI Layers 5, 6 or 7).

The TSO Offload Request 1102 may for example comprise a TSO identifier (ID) and may indicate an MTP size. The TSO ID may be used to identify the TSO offload registration in subsequent control messages exchanged between the client node A and the NOE Controller (VNF Coordinator). The MTP size in the TSO Offload Request 1102 indicates a suggested MTU size for the data link layer (Layer 2) PDUs to be transmitted by the client node A. Given that the NOE Controller (VNF Coordinator) accept the request 1102 of the client node A, the NOE Controller (VNF Coordinator) creates a TSO VNF session that is associated to the TSO Offload Request 1102 (e.g. through the TSO ID). The TSO VNF session may implement a reception protocol stack and transmission protocol stack and its functionality as outlined in connection with FIGS. 7 to 10 herein above. Furthermore, the NOE Controller (VNF Coordinator) may also assign a tunnel endpoint identifier (e.g. an IP address—TSO VNF IP) to the created TSO VNF session, which can be used by the client node A to tunnel the application data to the TSO VNF session for further processing (as explained in connection with FIGS. 7 to 10 above). Upon successful creation of the TSO VNF session for the client node A's TSO Offload Request 1102, the VNF Coordinator causes the gateway to send a TSO Offload Confirmation message 1104 back to the client node A.

The TSO Offload Confirmation message 1104 may for example comprise a field for indicating indicate acceptance or rejection of a request by the client node to offload segmentation to the network node; and a field comprising the tunnel endpoint identifier (TSO VNF IP). The may optionally include a field indicating a MTU/MSS size (MTP size) for data link layer (Layer 2 of the OSI protocol stack) PDUs to be tunneled from the client node A to the TSO VNF session. The MTP size indicated in the TSO Offload Confirmation message 1104 defines the multi-Layer 2 segment MTU to be used for communication between client node A and TSO VNF (session) at the network node. The MTP size is selected by the TSO VNF Coordinator so as to minimize the processing load in the Layer 2 segments between client node and TSO VNF (session) associated with SDU fragmentation due to the reliability of Layer 2 links between client node A and TSO VNF (session) at the network node.

Note that the MTP size in the TSO Offload Confirmation message 1104 may in the TSO Offload Confirmation message 1104 match the MTP size suggested by the client node A in the TSO Offload Request 1102, or the TSO VNF (session) may define the MTP size for Layer 2 PDUs for the tunneled data from the client node A. The client node A will use the MTP size as indicated in the TSO Offload Confirmation message 1104. TSO Offload Confirmation message 1104 may optionally include a segmentation offload identifier (TSO ID).

The client node A may store the information in the TSO Offload Confirmation message 1104 as local TSO context information for later use. The a data link layer in the reception protocol stack of the TSO VNF session and/or the protocol stack of the client node A may be configured with a MTP size (i.e. a MTU/MSS size) of data link layer protocol data units.

For example upon a user request or an automated/periodic request for the transmission of data from the application layer to a receiving node, the OS of the client node A may cause the establishment 1105 of a TCP connection with the receiving node. The OS will create a socket identifying the TCP connection at the client node A and will maintain corresponding socket information for the TCP connection endpoint at the receiving node. The socket defines a tuple of IP address and port number corresponding to the TCP connection. Note that for TCP connection establishment, the client node A may use a protocol stack implementation as shown in FIG. 3 or FIG. 4. Upon having established the TCP connection with the receiving node or in response to a separate decision or command to use off-device TSO offload, the OS of the client node A may send a TSO Offload Activation message 1106 to the TSO VNF session. The TSO VNF session may be for example addresses to the TSO VNF session of the gateway by using the tunnel endpoint identifier received in the TSO Offload Confirmation 1104. The TSO Offload Activation message 1106 may for example comprise TCP socket information on the TCP connection for which the TCP functionality should be offloaded to the TSO VNF session. The TCP socket information includes the socket information of the TCP connection endpoint (i.e. the IP address of the receiving node and port number of the TCP connection established at step 1105) and, optionally, additional metadata, such as e.g. a cookie that could be used to facilitate the processing of the tunneled data by TSO VNF session. Optionally, the TSO Offload Activation message 1106 may also comprise the TSO-ID. In response to the TSO Offload Confirmation 1104, the TSO VNF session causes the gateway to transmit a TSO Offload Activation Confirmation message 1107 to the client node A to confirm the activation of the TSO offloading. The TSO Offload Activation Confirmation message 1107 may for example comprise the TSO-ID.

Upon receipt of the TSO Offload Activation Confirmation message 1107 the client node A may now change the protocol stack as explained in connection with FIGS. 7 to 10 and may tunnel 1108 the application data as IP datagrams to the TSO VNF session. The tunneling protocol ensures that the (inner) IP packets 903 encapsulating the application data and destined to the receiving node are tunneled to the TSO VNF session by using the tunnel endpoint identifier (TSO VNF IP) as the IP destination address in the IP header 906 of outer IP packet 905, 906. The TSO VNF session decapsulates the application data and adds them for transmission 1109 via the TCP protocol 801 (and the lower layer of the transmission protocol stack) to the transmission buffer of the TCP protocol 801 as explained in connection with FIGS. 7 to 10.

Figure 12:
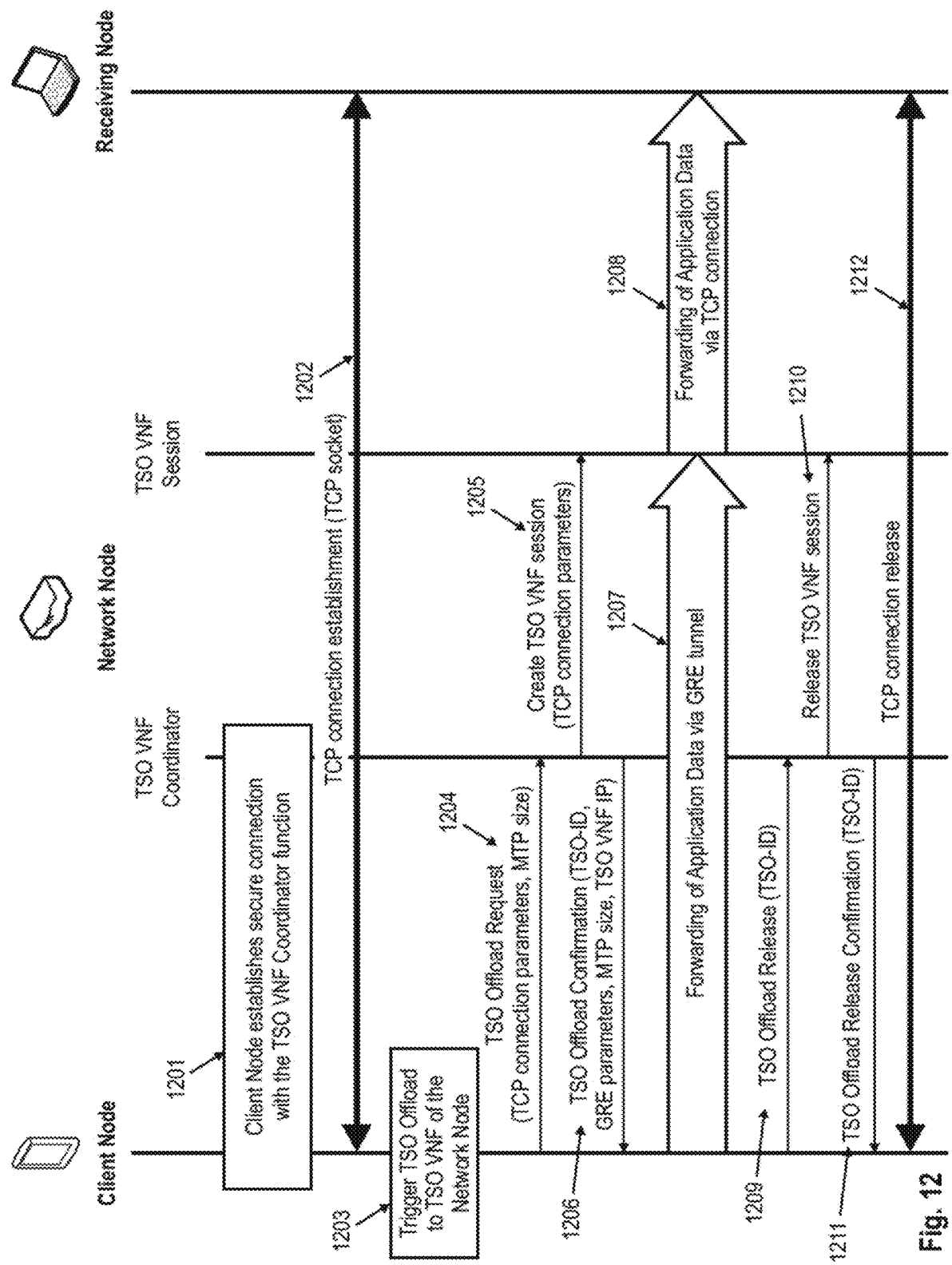
FIG. 12 shows an example process of a client node registering for off-device segmentation offloading at a gateway.

FIG. 12 shows a further example of a client node registering for off-device segmentation offloading at a gateway. The process of FIG. 12 may include a network node comprising a TSO VNF Coordinator transmitting 1101 (e.g. broadcast) some indication (e.g. as part of a beacon signal or broadcast system information) that the gateway facilitates off-device offloading of processing intensive tasks (similar to FIG. 11). Alternatively, the client node(s) may be pre-configured within settings (e.g. a list of Medium Access Control (MAC) and/or IP addresses identifying the network nodes and/or TSO VNF Coordinators, or a list of their Fully-Qualified Domain Names (FQDNs)) that indicate network node(s) that offer off-device offloading of processing intensive tasks. Again, the example of FIG. 12 considers an "off-device TSO offload" to the TSO VNF implemented in the network node for simplicity.

In step 1201 (which is optional) the client node may establish a secure connection to a TSO VNF Coordinator. This may include the TSO VNF Coordinator and the client node exchanging credentials (e.g. encryption keys) that allow securing subsequent messages exchanged by the entities on application layer.

Similar to FIG. 11, at some point in time the client node may decide to start communication with a receiving device. The client node establishes 1202 a TCP connection with the receiving node. The client node's OS may create a socket identifying the TCP connection at the client node. The socket defines a tuple of IP address and port number corresponding to the TCP connection. Note that for TCP connection establishment, the client node may use a protocol stack implementation as shown in FIG. 3 or FIG. 4.

After having established the TCP connection with the receiving node (and either before starting or during the communication with the receiving node via the TCP connection), the client node may trigger 1203 an offload of TCP protocol related processing to the TSO VNF implemented by the network node. The client node transmits a TSO Offload Request 1204 to the TSO VNF of the network node to register for the use of the "off-device TSO" functionality. The TSO Offload Request 1204 is provided for processing to the TSO VNF Coordinator of the network node for processing. The TSO Offload Request 1204 (as well as the other control messages 1206, 1209, and 1211) may be for example sent (received) by a control function or control protocol that resides in the application layer (e.g. one of OSI Layers 5, 6 or 7). The TSO Offload Request 1204 (as well as the other control messages 1206, 1209, and 1211) may optionally be integrity protected using the credentials obtained in step 1201.

The TSO Offload Request 1204 may for example comprise a TSO identifier (ID) (optional) and may indicate an MTP size. The TSO ID may be used to identify the TSO offload registration in subsequent control messages exchanged between the client node A and the TSO VNF Coordinator. The MTP size indicated in the TSO Offload Request 1102 indicates a suggested MTU size for the data link layer (Layer 2) PDUs to be transmitted by the client node. TSO Offload Request 1204 may further comprise the TCP connection parameters of the TCP session established in step 1202. The TCP connection parameters may for example comprise TCP socket information on the TCP connection for which the TCP functionality should be offloaded to the TSO VNF session. The TCP socket information includes the socket information of the TCP connection endpoint (i.e. the IP address of the receiving node and port number of the TCP connection established at step 1105) and, optionally, additional metadata, such as e.g. a cookie that could be used to facilitate the processing of the tunneled data by TSO VNF session Given that the TSO VNF Coordinator accept the request 1204, the TSO VNF Coordinator creates 1205 a TSO VNF session that is associated to the TSO Offload Request 1204 (e.g. through the TSO ID). The TSO VNF session may implement a reception protocol stack and transmission protocol stack and its functionality as outlined in connection with FIGS. 7 to 10 herein above. Furthermore, the TSO VNF Coordinator may also assign a tunnel endpoint identifier (e.g. an IP address—TSO VNF IP) to the created TSO VNF session. In one example the tunnel endpoint identifier is different from the TSO VNF Coordinator's network layer address. The tunnel endpoint identifier can be used by the client node to tunnel the application data to the TSO VNF session for further processing (as explained in connection with FIGS. 7 to 10 above). Upon successful creation of the TSO VNF session for the client node's TSO Offload Request 1204, the TSO VNF Coordinator causes the network node to confirm the request 1204 by sending a TSO Offload Confirmation message 1206 back to the client node.

The TSO Offload Confirmation message 1206 may correspond to the TSO Offload Confirmation message 1104 in its content. The client node may store the information in the TSO Offload Confirmation message 1206 as local TSO context information. The a data link layer in the reception protocol stack of the TSO VNF session and/or the protocol stack of the client node may be configured with a MTP size (i.e. a MTU/MSS size) of data link layer PDUs.

Upon receipt of the TSO Offload Confirmation message 1206, the client node may start offloading the TCP processing to the TSO VNF session implemented by the TSO VNF Coordinator. For this, the client node may change the protocol stack as explained in connection with FIGS. 7 to 10 and tunnel 1207 the application data as IP datagrams to the TSO VNF session. The tunneling protocol ensures that the (inner) IP packets 903 encapsulating the application data and destined to the receiving node are tunneled to the TSO VNF session by using the tunnel endpoint identifier (TSO VNF IP) as the IP destination address in the IP header 906 of outer IP packet 905, 906. The TSO VNF session decapsulates the application data and adds them for transmission 1208 via the TCP protocol 801 (and the lower layer of the transmission protocol stack) to the transmission buffer of the TCP protocol 801 as explained in connection with FIGS. 7 to 10.

Once the application layer at the client node intends to terminate the TCP connection, the client node may send a TSO Offload Release message 1209 to the TSO VNF Coordinator.

The TSO Offload Release message 1209 informs the TSO VNF Coordinator on the (intended) termination of the TCP connection. In response to the TSO Offload Release message 1209, the TSO VNF Coordinator may release 1210 the TSO VNF session for the client node. The TSO Offload Release message 1209 may comprise the TSO ID, which allows the TSO VNF Coordinator to identify the concerned the TSO VNF session that is to be released. Upon successful release 1210 of the TSO VNF session for the client node, the TSO VNF Coordinator confirms the release by sending a TSO Offload Release Confirmation message 1211 to the client node. This TSO Offload Release Confirmation message 1211 may again include the TSO ID which allows the client node detect the TSO Offload Release Confirmation message 1211 being related to its TSO Offload Release message 1209.

Upon receipt of the TSO Offload Release Confirmation message 1211, the client node may then terminate 1212 the TCP connection, e.g. by releasing the connection using the procedure described in RFC 793.

Figure 13:
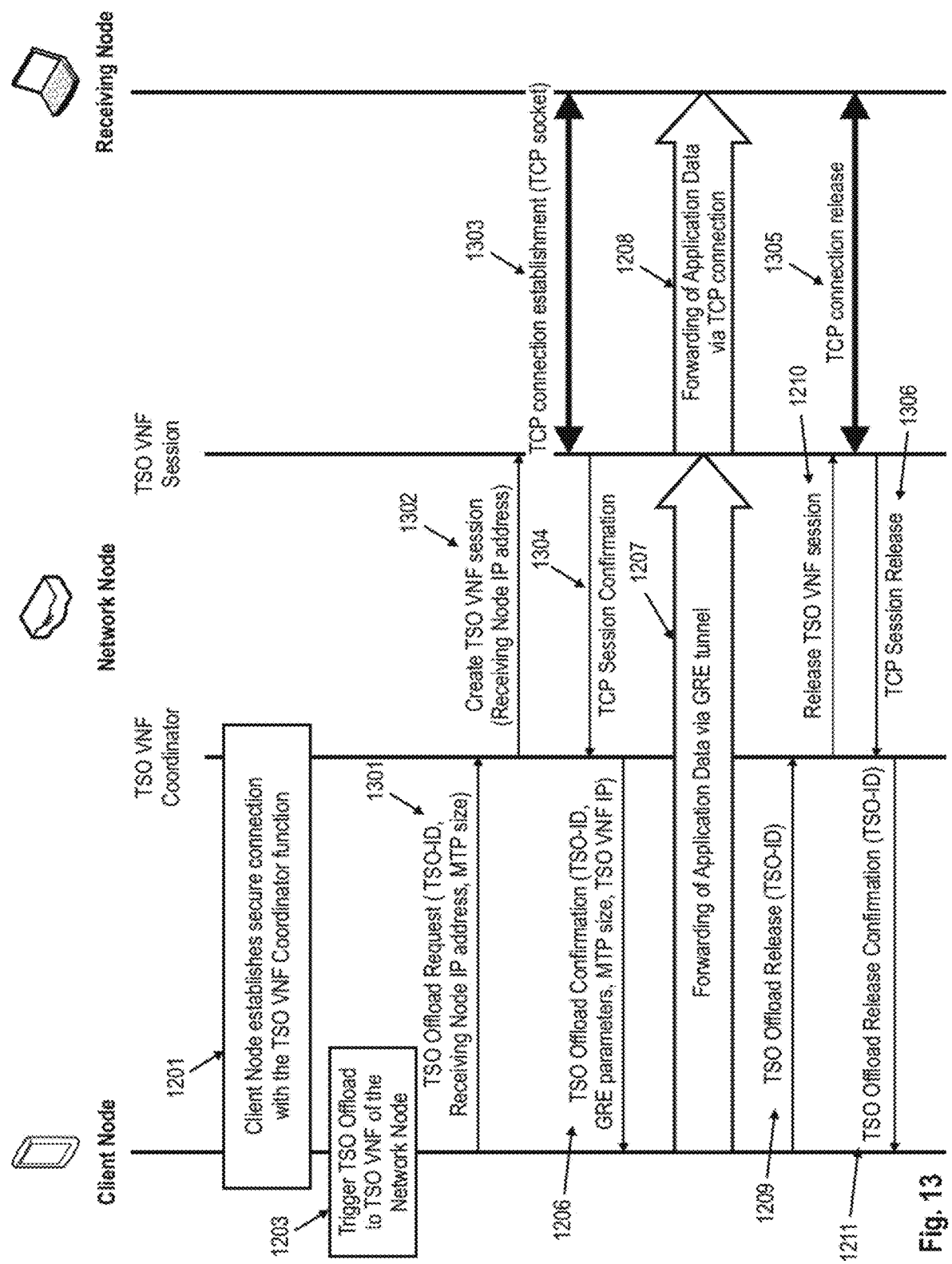
FIG. 13 shows another example process of a client node registering for off-device segmentation offloading at a gateway.

FIG. 13 shows another example process of a client node registering for off-device segmentation offloading at a gateway. The example process in FIG. 13 is similar to that in FIG. 12 except for the TSO VNF session associated to the client node establishing (and terminating) the TCP connection with the receiving node. Accordingly, the TSO Offload Request 1204 is modified so as to comprise a (temporarily) unique identifier of the receiving node. Such identifier could be for example a network layer address (e.g. IP address) of the receiving node as shown in the example TSO Offload Request 1301 or may be a FQDN of the receiving node. TSO Offload Request 1301 may also comprise a TSO ID (optional) and may indicate the MTP size similar to TSO Offload Request 1204 in FIG. 12.

Given that the TSO VNF Coordinator accept the request 1301, the TSO VNF Coordinator creates 1302 a TSO VNF session that is associated to the TSO Offload Request 1204 (e.g. through the TSO ID). The TSO VNF session may implement a reception protocol stack and transmission protocol stack and its functionality as outlined in connection with FIGS. 7 to 10 herein above. Furthermore, the TSO VNF Coordinator may also assign a tunnel endpoint identifier (e.g. an IP address—TSO VNF IP) to the created TSO VNF session. In one example the tunnel endpoint identifier is different from the TSO VNF Coordinator's network layer address. The TSO VNF Coordinator configures the TSO VNF session so as to establish 1303 a TCP connection to the receiving node. This may involve the TSO VNF Coordinator or the TSO VNF session resolving the IP address of the receiving node from the FQDN. Alternatively, the IP address of the receiving node may be comprised in the TSO Offload Request 1301 as noted earlier. The TSO VNF session may inform 1304 the TSO VNF Coordinator on whether the TCP connection could be successfully established.

Upon successful establishment of the TCP connection and creation of the TSO VNF session for the client node's TSO Offload Request 1204, the TSO VNF Coordinator causes the network node to confirm the request 1301 by sending a TSO Offload Confirmation message 1206 back to the client node. The client node may store the information in the TSO Offload Confirmation message 1206 as local TSO context information.

The subsequent forwarding 1207 of the application data via the GRE tunnel between the client node and the TSO VNF session, and the transmission 1208 of the application data further towards the receiving node is similar to that described in connection with FIG. 12 above.

Also similar to FIG. 12, once the application layer at the client node intends to terminate the TCP connection, the client node may send a TSO Offload Release message 1209 to the TSO VNF Coordinator. In response to the TSO Offload Release message 1209, the TSO VNF Coordinator may release 1210 the TSO VNF session for the client node. This release may comprise the TSO VNF session terminating 1305 the TCP session with the receiving node. The success of the termination of the TCP connection with the receiving node is then signaled 1306 from the TSO VNF session to the TSO VNF Coordinator. Upon successful release 1210, 1306 of the TCP connection and TSO VNF session for the client node, the TSO VNF Coordinator confirms the release by sending a TSO Offload Release Confirmation message 1211 to the client node.

Although the above example mainly focused on offloading TCP related processing (including segmentation, checksum calculation and flow control) from the client node to the TSO VNF at a network node, it should be noted that the examples are of course not limited to offloading only TCP related processing to a TSO VNF session. Generally, embodiments generally encompass the offloading of transport layer functionality from the client node to a network node. Hence, instead of TCP, the transport layer protocols (e.g. UDP, DCCP, SCTP, etc.) and/or network layer protocols may be offloaded from a client node to another network node.

Figure 14:
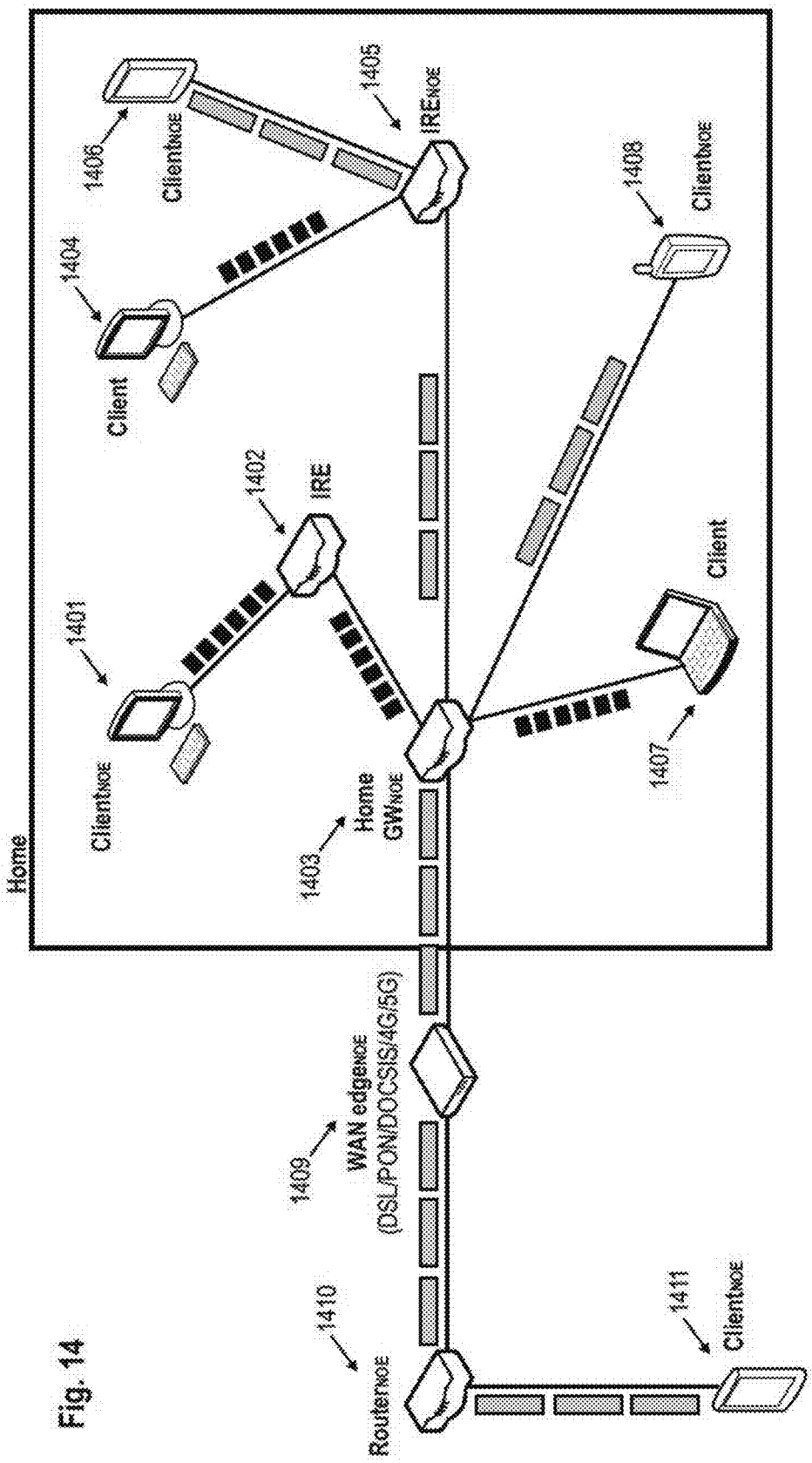
FIG. 14 shows an example of nodes in a home network connected to a WAN that enables application data transmission using the concepts of this disclosure.

FIG. 14 shows an example of nodes in a home network connected to a WAN that enables application data transmission using the concepts of this disclosure. In FIG. 14, devices that support offloading functionality of transport layer protocols to another network node are indicated by the index "NOE" to indicate that they comprise a network offloading engine (NOE) that facilitates the procedures exemplarily described herein above in connection with FIGS. 1 to 13.

Whether or not a device can offloading functionality of a transport layer protocol to the "next hop" in the network depending on whether or not the "next hop" comprises a NOE. For example, client device 1401 may implement a NOE, but the next hop, the intermediate routing entity (IRE) 1402 does not implement a NOE. Accordingly, client device 1401 needs to use a protocol stack implementation as for example shown in FIG. 3 or FIG. 4 for communication with the IRE 1402, which implements a "full" transport layer implementation. This is exemplified by the multiple black rectangles that are intended to illustrate the segmentation of the application data to small packets according to the MTU/MSS size defined in a transport layer protocol of the protocol stack implementation. Similarly, although the Home GW 1403 has a NOE, in view of IRE 1402 lacking a NOE, also the link between the IRE 1402 and Home GW 1403 use a protocol stack implementation as for example shown in FIG. 3 or FIG. 4 imposing small packet sizes on the link between IRE 1402 and Home GW 1403.

The situation on the network link between the client device 1404 and the IRE 1405 is similar. Although IRE 1405 implements a NOE and could thus serve as an offload-node taking over some of the functionality of transport layer on behalf of the client device 1404, the network link between the client device 1404 and the IRE 1405 also uses a protocol stack implementation as for example shown in FIG. 3 or FIG. 4 imposing small packet sizes on the link between the two nodes, as the client device 1404 does not implement a NOE.

As regards client node 1406, this device implements a NOE, and so does IRE 1405. Accordingly, the client node 1406 may offload functionality of transport layer (as for example described in connection with FIGS. 1 to 13 (with the IRE 1405 corresponding to the "network node" or "gateway" in these examples) for the case of off-device TSO, to the IRE 1405. This is exemplarily indicated by the larger grey rectangles that are intended to illustrate the tunneling of the application data without the use of a transport layer protocol (i.e. relying only on the ARQ mechanism of a link layer in the protocol stack between the client node 1406 and IRE 1405).

Figure 15:
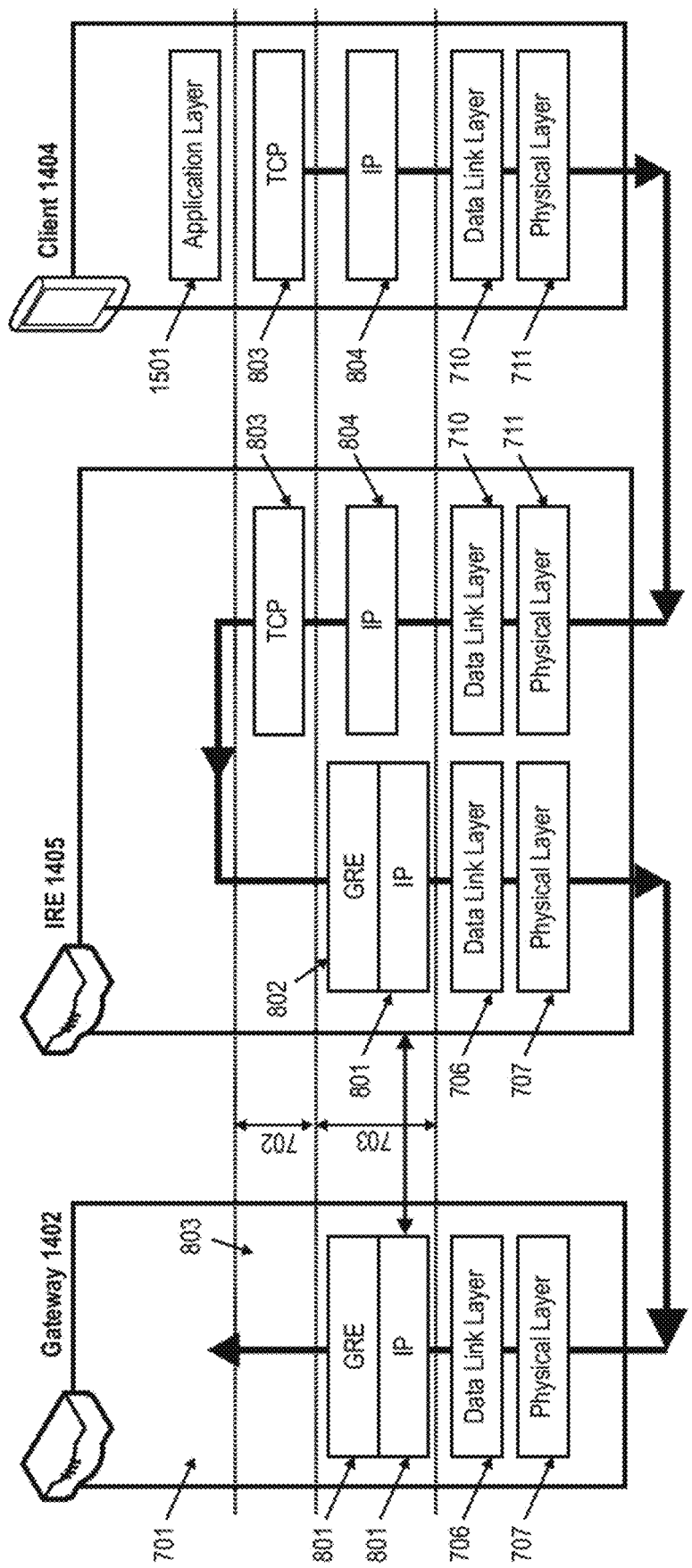
FIG. 15 shows an example process of forwarding data received from a client node with no Network Offloading Engine (NOE) from an intermediate routing entity (IRE) to a gateway implementing off-device TSO in said forwarding of the application data from the IRE to the gateway.

Similarly, the concepts of offload functionality of transport layer may also be employed on the link between the IRE 1405 and Home GW 1403. Note that in one example, the IRE 1405 may terminate the transport layer towards the client node 1404 and may aggregate the application data from smaller sized packets received from the client node 1404 into larger packets for transmission via a tunnel on the link between the IRE 1405 and Home GW 1403. This example scenario is highlighted in FIG. 15. In this case the IRE 1405 may take the role of a "client node" in the registration of the off-device TSO to Home Gateway 1402 as described in connection with FIGS. 11 to 13.

Figure 16:
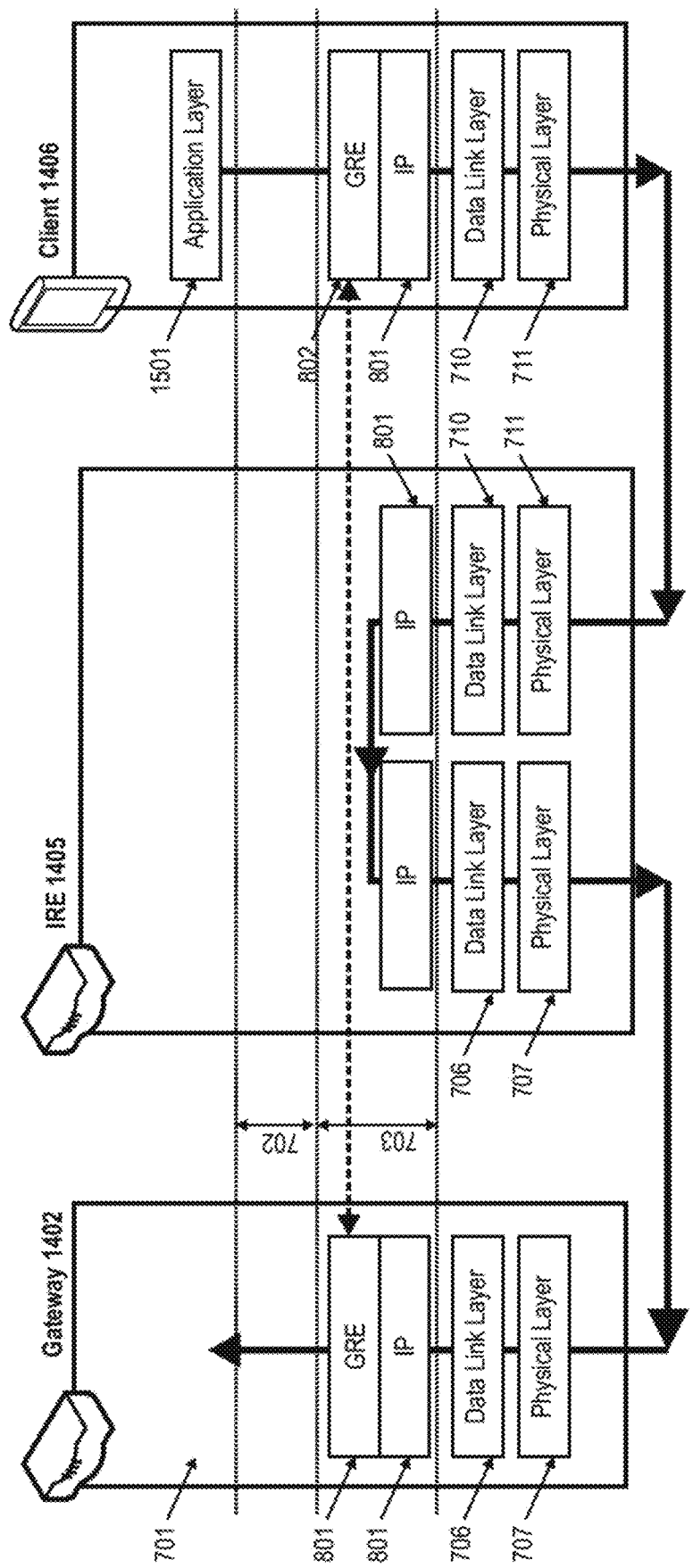
FIG. 16 shows an example process of forwarding data received from a client node at an IRE operating as a routing entity to a gateway, wherein the client node uses off-device TSO to the gateway.
Figure 17:
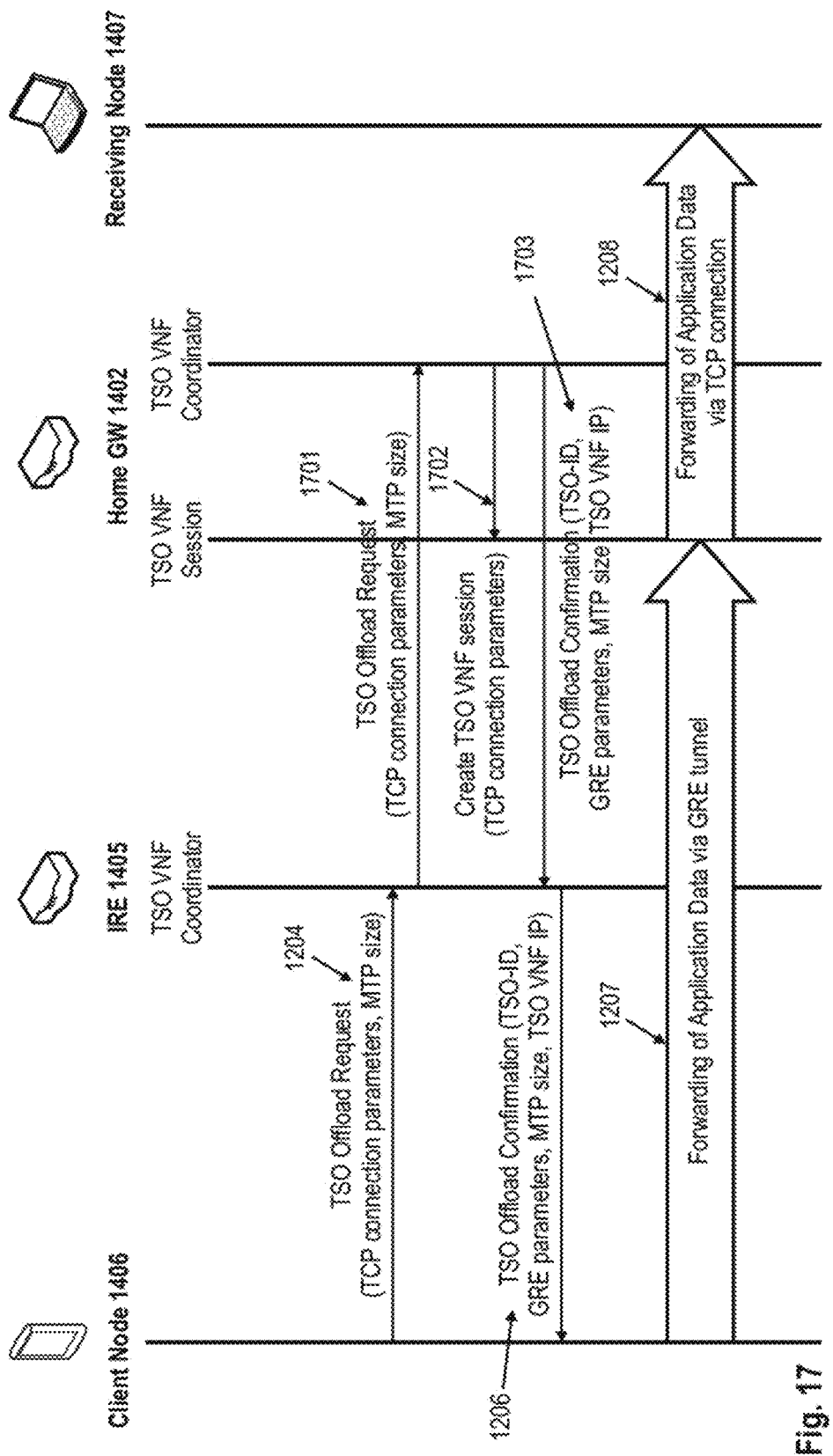
FIG. 17 shows another example process of a client node registering for off-device TSO at a node closer to the receiving node to receive the application data.

In another example, the client node 1406 may also offload the functionality of transport layer to the Home Gateway 1402 instead of the IRE 1405. Such an example is illustrated exemplarily in FIG. 16. In this case the IRE 1405 may simply act as a Layer 3 (network layer) router. The IP packets transmitted from the network layer 703 in the client node 1206 would look like those in FIG. 9, and the outer IP header 906 containing as the destination address the IP address of the TSO VFN session at the Home Gateway 1402. The IRE 1405 may only inspect the outer IP header 906 and would route the IP packets to the Home Gateway 1402 (respectively, the TSO VFN session implemented thereon). In this latter example scenario related to FIG. 16, the client node 1406 the registration process of the processing offload to the Home Gateway 1402 may be implemented as described in connection with FIGS. 11 to 13 herein above, with the client node 1406 corresponding to the "client node A", respectively, "client node" and the Home Gateway 1402 corresponding to the "gateway", respectively, "network node" in those examples. In an alternative, the registration process for offloading functionality may be based on the examples in FIGS. 12 and 13, but in in this alternative the IRE 1405 would receive the TSO Offload Request 1204, 1301 from client node 1406 (as indicted in FIG. 17). The IRE 1405 (also implementing a NOE) may recognize based on the TCP connection parameters (as in FIG. 12) or the IP address/FQDN of the receiving node 1407 in the TSO Offload Request 1204, 1301 that the receiving node 1407 is not directly connected to the IRE 1405. This detection may be for example based on a routing table maintained in the IRE 1405 for routing, which indicates that packets destined to the receiving node 1407 are forwarded to the Home Gateway 1402. Accordingly, the IRE 1405 may forward 1701 the TSO Offload Request 1204, 1301 to the Home Gateway 1402. The TSO VNF Coordinator (as part of the NOE) of the Home Gateway 1402 may detect that that the receiving node 1407 is connected to the Home Gateway 1402 (e.g. on a WiFi link offered by the Home Gateway 1402 acting also an AP). Therefore, the TSO VNF Coordinator of the Home Gateway 1402 creates 1702 a TSO VNF session similar to the example in FIG. 12 or FIG. 13, and confirms the creation of the request 1204, 1701 by sending 1703 a TSO Offload Confirmation 1206 back to the IRE 1405, which will forward the TSO Offload Confirmation 1206 to the client node 1406. Accordingly, the TSO Offload Confirmation 1206 will include a tunnel endpoint identifier of the TSO VNF session now created at the Home Gateway 1402, so that the tunneled application data will be sent via a tunnel established between the client node 1406 and TSO VNF session now created at the Home Gateway 1402 as indicated in FIG. 16. Notably, if the receiving node would for example be TSO Offload Request 1204 would correspond to, for example, client node 1411, the Home Gateway 1402 may recognize that the client node 1411 is not connected Home Gateway 1402 and may again forward the TSO Offload Request 1204 to the next hop according to its routing information (i.e. WAN edge 1409 in this example). WAN edge 1409 may again relay the request to router 1410 which may be creating the TSO VNF session and respond with a TSO Offload Confirmation that is routed back to the client node 1406. In principle, this relay mechanism of the TSO Offload Request 1204 may ensure that the TCP functionality is offloaded to a node closest to the receiving node (client node 1411 in this example). In case a "next hop" to which the TSO Offload Request 1204 is relayed is not implementing a NOE, an error message may be returned and the relaying node may thus know that it is the node with a NOE "closest" to the receiving node. Hence, the relaying node may create the TSO VNF session for the TSO offload and will return the TSO Offload Confirmation indicating its created TSO VNF session as the tunnel endpoint.

Additional Embodiments

Additional Example 1 provides a network node for performing segmentation on behalf of a transmitting node. The network node comprises a processor and memory. The processor is configured to provide: a reception protocol stack configured to receive network layer packet data units each including a transport layer service data unit from the transmitting node, wherein the transport layer service data units encapsulate application data and are devoid of a transport layer header facilitating reliability of the data delivery between the network node and the transmitting node; wherein the processor is further configured to provide a transmission protocol stack configured to transmit the service data units towards a receiving node; wherein the transmission protocol stack includes a transport layer having a transport layer protocol that segments the service data units into segments and adds a transport layer header to the segments prior to their transmission to the receiving node.

Additional Example 2 relates to the network node of Additional Example 1, in which the processor is further configured to add the service data units into a transmission buffer of a protocol in the transport layer of the transmission protocol stack; and wherein segmentation of the service data units is implemented by the transport layer protocol in the transmission protocol stack receiving segments of data of said service data units from the transmission buffer.

Additional Example 3 relates to the network node of Additional Example 1 or 2, wherein the size of the service data units received via the reception protocol stack is larger than the maximum transmission unit size of the transport layer protocol in the transmission protocol stack.

Additional Example 4 relates to the network node of one of Additional Examples 1 to 3, wherein a data link layer of the reception protocol stack ensures reliability by implementing an automatic repeat request mechanism.

Additional Example 5 relates to the network node of one of Additional Examples 1 to 4, wherein the network layer of the reception protocol stack implements a network layer tunneling protocol that receives the protocol data units from the transmitting node.

Additional Example 6 relates to the network node of Additional Example 5, wherein the tunneling protocol is Generic Routing Encapsulation (GRE), a GPRS Tunneling Protocol (GTP) or Point-to-Point Tunneling Protocol (PPTP), Layer 2 Tunneling Protocol (L2TP).

Additional Example 7 relates to the network node of one of Additional Examples 1 to 6, wherein the transport layer in the transmission protocol stack is a Transmission Control Protocol (TCP), a User Datagram Protocol (UDP), Datagram Congestion Control Protocol (DCCP) or Stream Control Transmission Protocol (SCTP).

Additional Example 8 relates to the network node of one of Additional Examples 1 to 7, wherein the network layer in the transmission protocol stack and/or the reception protocol stack is Internet Protocol (IP).

Additional Example 9 relates to the network node of one of Additional Examples 1 to 8, wherein processor is configured to implement, for each transmission node requesting to offload segmentation to the network node, a separate transmission protocol stack and reception protocol stack in a virtual network function.

Additional Example 10 relates to the network node of Additional Example 9, wherein the virtual network function is identified by a network layer address assigned thereto.

Additional Example 11 relates to the network node of one of Additional Examples 9 or 10, wherein a data link layer of the reception protocol stack is configured to route decapsulated network layer packet data units (PDUs) to the virtual network function corresponding to a network layer destination address comprised in the decapsulated network layer PDUs.

Additional Example 12 provides a network node for registering a segmentation-offload for a transmitting node, the network node comprising a processor and memory, wherein the processor is configured to: receive a segmentation offload request from a transmitting node connected to the network node via a network; in response to receipt of said segmentation offload request, create virtual network function implementing a reception protocol stack for reception of application data from the transmitting node and a transmission protocol stack for transmission of the application data towards the receiving node, wherein said transmission protocol stack implements segmentation of the application data at a transport layer of the transmission protocol stack, assign a tunnel endpoint identifier to the virtual network function for facilitating network layer tunneling of the application data from the transmitting node to the network node via said network; and transmit a segment offload response to the transmitting node, the segment offload response comprising the tunnel endpoint identifier.

Additional Example 13 relates to the network node of Additional Example 12, wherein the segmentation offload request comprises an Internet protocol (IP) address or Fully-Qualified Domain Name (FQDN) of a receiving node and 14 relates to the network node of Additional Example 13, wherein the segmentation offload request further includes information on the IP address and port tuples of an established transport layer connection from the transmitting node to the receiving node.

Additional Example 15 relates to the network node of Additional Example 13, wherein the wherein the processor is configured to establish a transport layer connection with the receiving node using the IP address or FQDN of a receiving node.

Additional Example 16 relates to the network node of Additional Example 14 or 15, wherein the transport layer connection is a TCP connection, UDP connection, DCCP connection or SCTP connection.

Additional Example 17 relates to the network node of one of Additional Examples 12 to 16, wherein the tunnel endpoint identifier is an IP address assigned to the virtual network function.

Additional Example 18 relates to the network node of one of Additional Examples 12 to 17, wherein the tunnel is implemented using Generic Routing Encapsulation (GRE), a GPRS Tunneling Protocol (GTP) or Point-to-Point Tunneling Protocol (PPTP).

Additional Example 19 relates to the network node of one of Additional Examples 12 to 17, wherein the segment offload request comprises a segmentation offload identifier and the segment offload response comprises the segmentation offload identifier.

Additional Example 20 relates to the network node of one of Additional Examples 12 to 19, wherein the processor is configured to configure a data link layer in the reception protocol stack of the virtual network function with a maximum transmission unit (MTU)/maximum segment size (MSS) size of data link layer protocol data units.

Additional Example 21 relates to the network node of Additional Example 20, wherein the segment offload request comprises said MTU/MSS size of data link layer protocol data units that are to be transmitted from the transmitting node to the network node.

Additional Example 22 relates to the network node of Additional Example 20, wherein the segment offload request comprises a suggested MTU/MSS size of data link layer protocol data units that are to be transmitted from the transmitting node to the network node, and the processor is configured to select another MTU/MSS size as said MTU/MSS size of data link layer protocol data units.

Additional Example 23 relates to the network node of Additional Example 22, wherein the segmentation offload response comprises said other MTU/MSS size to configure the transmitting node to transmit data link layer protocol data units of said other MTU/MSS size to the network node.

Additional Example 24 relates to the network node of one of Additional Examples 12 to 23, wherein a network layer tunneling protocol of the reception protocol stack of the virtual network function is adapted to receive network layer protocol data units tunneled from the transmitting node to the network node, wherein said network layer protocol data units encapsulate application data and are devoid of a transport layer header facilitating reliability of the data delivery between the network node and the transmitting node, and wherein a transport layer protocol of the transmission protocol stack of the virtual network function is configured to segment and encapsulate the transport layer service data units for transmission to the receiving node via the transmission protocol stack of the virtual network function.

Additional Example 25 relates to the network node of one of Additional Examples 12 to 24, wherein a data link layer of the reception protocol stack ensures reliability by implementing an automatic repeat request mechanism.

Additional Example 26 provides a home gateway implementing a network node according to one of Additional Examples 1 to 25.

Additional Example 27 relates to the home gateway of Additional Example 26, further comprising a broadband modem for connecting a home network to a wide area network (WAN).

Additional Example 28 relates to the home gateway of Additional Example 27, wherein the home network is a WiFi network, Ethernet network, or FDDI network.

Additional Example 29 relates to the home gateway of Additional Examples 27 or 28, wherein the WAN is a cellular core network, a SONET, or ATM network.

Additional Example 30 provides a client node for registering a segmentation-offload at a network node, the client node comprising a processor and memory, wherein the processor is configured to: transmit a segmentation offload request to the network node connected to the client node via a network; receive a segment offload response from the network node, the segment offload response comprising a tunnel endpoint identifier; and configure, in response to the segment offload response, a network layer tunneling protocol of a transmission protocol stack provided by the client node to tunnel network layer protocol data units to the network node using the tunnel endpoint identifier, wherein said network layer protocol data units encapsulate application data and are devoid of a transport layer header facilitating reliability of the data delivery between the network node and the client node.

Additional Example 31 relates to the client node of Additional Example 30, wherein the segmentation offload request comprises an Internet protocol (IP) address or Fully-Qualified Domain Name (FQDN) of a receiving node.

Additional Example 32 relates to the client node of Additional Example 31, wherein the segmentation offload request further includes information on the IP address and port tuples of an established transport layer connection from the transmitting node to the receiving node.

Additional Example 33 relates to the client node of Additional Example 32, wherein the processor is configured to establish a transport layer connection with the receiving node using the IP address or FQDN of the receiving node.

Additional Example 34 relates to the client node of Additional Example 32 or 33, wherein the transport layer connection is a TCP connection, UDP connection, DCCP connection or SCTP connection.

Additional Example 35 relates to the client node of one of Additional Examples 30 to 34, wherein the tunnel endpoint identifier is an IP address assigned to the virtual network function.

Additional Example 36 relates to the client node of one of Additional Examples 30 to 35, wherein the tunnel is implemented using Generic Routing Encapsulation (GRE), a GPRS Tunneling Protocol (GTP) or Point-to-Point Tunneling Protocol (PPTP).

Additional Example 37 relates to the client node of one of Additional Examples 30 to 36, wherein the segment offload request comprises a segmentation offload identifier and the segment offload response comprises the segmentation offload identifier.

Additional Example 38 relates to the client node of one of Additional Examples 30 to 37, wherein the segment offload request or the segment offload response comprises a maximum transmission unit (MTU)/maximum segment size (MSS) size of data link layer protocol data units that are to be transmitted from the client node to the network node; wherein the processor is configured to provide transmission protocol stack, and to configure a data link layer in the transmission protocol stack with said MTU/MSS size of data link layer protocol data units.

Additional Example 39 relates to the client node of Additional Example 38, wherein the segment offload request comprises a suggested MTU/MSS size of data link layer protocol data units that are to be transmitted from the transmitting node to the network node, and the segment offload response comprises another MTU/MSS size as said MTU/MSS size of data link layer protocol data units; wherein the processor is configured to configure the data link layer in the transmission protocol stack with said other MTU/MSS size of data link layer protocol data units.

Additional Example 40 relates to the client node of one of Additional Examples 30 to 39, wherein a data link layer of the transmission protocol stack ensures reliability by implementing an automatic repeat request mechanism.

Additional Example 41 provides a method for performing segmentation on behalf of transmitting node, the method comprising: providing a reception protocol stack configured to receive network layer packet data units each including a transport layer service data unit from the transmitting node, wherein the transport layer service data units encapsulate application data and are devoid of a transport layer header facilitating reliability of the data delivery between the network node and the transmitting node; providing a transmission protocol stack configured to transmit the service data units towards a receiving node; wherein the transmission protocol stack includes a transport layer having a transport layer protocol that segments the service data units into segments and adds a transport layer header to the segments prior to their transmission to the receiving node.

Additional Example 42 provides a method for registering a segmentation-offload for a transmitting node, the method comprising: receiving a segmentation offload request from a transmitting node connected to the network node via a network; in response to receipt of said segmentation offload request, creating virtual network function implementing a reception protocol stack for reception of application data from the transmitting node and a transmission protocol stack for transmission of the application data towards the receiving node, wherein said transmission protocol stack implements segmentation of the application data at a transport layer of the transmission protocol stack, assigning a tunnel endpoint identifier to the virtual network function for facilitating network layer tunneling of the application data from the transmitting node to the network node via said network; and transmitting a segment offload response to the transmitting node, the segment offload response comprising the tunnel endpoint identifier.

Additional Example 43 provides a method for registering a segmentation-offload at a network node, the method comprising a client node performing the following: transmitting a segmentation offload request to the network node connected to the client node via a network; receiving a segment offload response from the network node, the segment offload response comprising a tunnel endpoint identifier; and providing a transmission protocol stack comprising a network layer implementing a network layer tunneling protocol; configuring, in response to the segment offload response, the network layer tunneling protocol to tunnel network layer protocol data units to the network node using the tunnel endpoint identifier, wherein said network layer protocol data units encapsulate application data and are devoid of a transport layer header facilitating reliability of the data delivery between the network node and the client node.

Additional Example 44 provides one or more computer readable media storing instructions that, when executed by a processor in a network node, cause the network node to perform segmentation on behalf of transmitting node, by: providing a reception protocol stack configured to receive network layer packet data units each including a transport layer service data unit from the transmitting node, wherein the transport layer service data units encapsulate application data and are devoid of a transport layer header facilitating reliability of the data delivery between the network node and the transmitting node; providing a transmission protocol stack configured to transmit the service data units towards a receiving node; wherein the transmission protocol stack includes a transport layer having a transport layer protocol that segments the service data units into segments and adds a transport layer header to the segments prior to their transmission to the receiving node.

Additional Example 45 provides one or more computer readable media storing instructions that, when executed by a processor in a network node, cause the network node to register a segmentation-offload for a transmitting node, by: receiving a segmentation offload request from a transmitting node connected to the network node via a network; in response to receipt of said segmentation offload request, creating virtual network function implementing a reception protocol stack for reception of application data from the transmitting node and a transmission protocol stack for transmission of the application data towards the receiving node, wherein said transmission protocol stack implements segmentation of the application data at a transport layer of the transmission protocol stack, assigning a tunnel endpoint identifier to the virtual network function for facilitating network layer tunneling of the application data from the transmitting node to the network node via said network; and transmitting a segment offload response to the transmitting node, the segment offload response comprising the tunnel endpoint identifier.

Additional Example 46 provides one or more computer readable media storing instructions that, when executed by a processor in a client node, cause the client node to offload segmentation to a network node, by: transmitting a segmentation offload request to the network node connected to the client node via a network; receiving a segment offload response from the network node, the segment offload response comprising a tunnel endpoint identifier; and providing a transmission protocol stack comprising a network layer implementing a network layer tunneling protocol; configuring, in response to the segment offload response, the network layer tunneling protocol to tunnel network layer protocol data units to the network node using the tunnel endpoint identifier, wherein said network layer protocol data units encapsulate application data and are devoid of a transport layer header facilitating reliability of the data delivery between the network node and the client node.

Additional Example 47 provides a segmentation offload request message for transmission from a client node to a network node to request the network node to perform segmentation on behalf of the client node, the segmentation offload request message comprising: a first field to indicate an Internet protocol (IP) address or Fully-Qualified Domain Name (FQDN) of a receiving node that is to receive application data from the client node; and a second field for suggesting a MTU/MSS size for data link layer protocol data units that are to be transmitted from the client node to the network node.

Additional Example 48 relates to the segmentation offload request message of Additional Example 47 further comprising: a third field for indicating the client node's IP address and port of an established transport layer connection from the client node to the receiving node; and wherein the first field indicates the receiving node's IP address and port of the transport layer connection.

Additional Example 49 relates to the segmentation offload request message of Additional Example 47 further comprising: a third field for indicating the client node's IP address and port of an established transport layer connection from the client node to the receiving node; and a fourth field for indicating the receiving node's IP address and port of the transport layer connection.

Additional Example 50 relates to the segmentation offload request message of one of Additional Examples 47 to 49, further comprising context information related to a network layer tunneling protocol to be used for tunneling network layer protocol data units from the client node to the network node.

Additional Example 51 provides a segmentation offload response message for transmission from a network node to a client node to confirm a request for the network node to perform segmentation on behalf of the client node, the segmentation offload conformation message comprising: a first field to indicate acceptance or rejection of a request by the client node to offload segmentation to the network node; and a second field comprising a tunnel endpoint identifier of a network layer tunnel to be used by the client node to tunnel application data to the network node.

Additional Example 52 relates to the segmentation offload response message of Additional Example 51, further comprising a third field indicating a MTU/MSS size for data link layer protocol data units to be transmitted from the client node to the network node.

Additional Example 53 relates to the segmentation offload response message of Additional Example 51 or 52, further comprising a fourth field comprising a segmentation offload identifier.

Additional Example 54 relates to the segmentation offload response message of one of Additional Examples 51 to 53, further comprising a one or more fields for providing parameters of the network layer tunneling protocol to the client node.

It should be understood that many of the functional units of the different nodes/devices described in this specification may be implemented as one or more components, which is a term used to more particularly emphasize their implementation independence. For example, the functionality of the NOE provided in different nodes/devices may be implemented in one or more such components. Also the functionality of the VNF Coordinator may be implemented in one or more components. In another example, the functionality of the protocol stacks of the different nodes/devices and/or the implementation of a TSO VNF session may be provided in form of one or more components.

For example, a component may be—at least in part— implemented as a hardware circuit or multiple hardware circuits, which may for example include custom very large scale integration (VLSI) circuits or gate arrays, off-the-shelf semiconductors such as logic chips, transistors, operational amplifiers, programmable and variable amplifiers, monolithic or integrated filters, discrete component filters or other discrete components. A component may also be implemented in programmable hardware devices such as field programmable gate arrays, programmable array logic, programmable logic devices, or the like.

Components may also be implemented—at least in part—in software instructions for execution by various types of processors. For example, the process of collecting measurements and calculating the updated modulation profile could be implemented in form of a component of executable code (software instructions) to be executed by one or more processors of the node. This component of executable code may be for example part of the firmware of the node/device. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

A processor that can execute software instructions that—at least in part—implement a component may be realized for example by using a single-core or multi-core computer processing unit (CPU) or digital signal processor (DSP). However, the processing capabilities required may also be implemented by multiple processors and/or programmable hardware devices such as field programmable gate arrays, programmable array logic, programmable logic devices, or the like.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

In the above description of illustrated examples of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means" or "units") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A network node for performing segmentation on behalf of a transmitting node, the network node comprising:
   a processor and memory, wherein the processor is configured to execute operations comprising:
   receive network layer packet data units, each including a transport layer service data unit from the transmitting node, wherein the transport layer service data units encapsulate application data and are devoid of a transport layer header facilitating reliability of the data delivery between the network node and the transmitting node;
   add the service data units into a transmission buffer of a protocol in a transport layer of a transmission protocol stack
   transmit the service data units towards a receiving node by segmenting a transport layer protocol the service data units into segments, and adding a transport layer header to the segments prior to their transmission to the receiving node, wherein segmentation of the service data units is implemented by the transport layer protocol in the transmission protocol stack receiving segments of data of said service data units from the transmission buffer.

2. The network node of claim 1, wherein the size of the service data units received via a reception protocol stack is larger than the maximum transmission unit size of the transport layer protocol in the transmission protocol stack.

3. The network node of claim 1, wherein a data link layer of a reception protocol stack ensures reliability by implementing an automatic repeat request mechanism.

4. The network node of claim 1, wherein a network layer of a reception protocol stack implements a network layer tunneling protocol that receives the protocol data units from the transmitting node, and wherein the tunneling protocol is Generic Routing Encapsulation (GRE), a GPRS Tunneling Protocol (GTP) or Point-to-Point Tunneling Protocol (PPTP), Layer 2 Tunneling Protocol (L2TP), and wherein a transport layer in the transmission protocol stack is a Transmission Control Protocol (TCP), a User Datagram Protocol (UDP), Datagram Congestion Control Protocol (DCCP) or Stream Control Transmission Protocol (SCTP).

5. The network node of claim 4, wherein the network layer in the transmission protocol stack is Internet Protocol (IP).

6. The network node of claim 1, wherein processor is configured to implement, for each transmission node requesting to offload segmentation to the network node, a separate transmission protocol stack and reception protocol stack in a virtual network function.

7. The network node of claim 6, wherein the virtual network function is identified by a network layer address assigned thereto.

8. The network node of one of claim 6, wherein a data link layer of a reception protocol stack is configured to route decapsulated network layer packet data units (PDUs) to the virtual network function corresponding to a network layer destination address comprised in the decapsulated network layer PDUs.

9. A network node for registering a segmentation-offload for a transmitting node, the network node comprising:
a processor and memory, wherein the processor is configured to execute operations comprising:
receive, at the processor, a segmentation offload request from a transmitting node connected to the network node via a network;
in response to receipt of said segmentation offload request, create, by the processor, virtual network function implementing a reception protocol stack for reception of application data from the transmitting node and a transmission protocol stack for transmission of the application data towards the receiving node, wherein said transmission protocol stack implements segmentation of the application data at a transport layer of the transmission protocol stack, wherein the segment offload request comprises a segmentation offload identifier;
assign, by the processor, a tunnel endpoint identifier to the virtual network function for facilitating network layer tunneling of the application data from the transmitting node to the network node via said network; and
transmit a segment offload response to the transmitting node, the segment offload response comprising the tunnel endpoint identifier, wherein the segment offload response comprises the segmentation offload identifier.

10. The network node of claim 9, wherein the segmentation offload request comprises an Internet protocol (IP) address or Fully-Qualified Domain Name (FQDN) of a receiving node.

11. The network node of claim 10, wherein the segmentation offload request further includes information on the IP address and port tuples of an established transport layer connection from the transmitting node to the receiving node or wherein the wherein the processor is configured to establish a transport layer connection with the receiving node using the IP address or FQDN of a receiving node.

12. The network node of claim 10, wherein the transport layer connection is a Transmission Control Protocol (TCP) connection, User Datagram Protocol (UDP) connection, Datagram Congestion Control Protocol (DCCP) connection or Stream Control Transmission Protocol (SCTP) connection, or wherein the tunnel endpoint identifier is an IP address assigned to the virtual network function, or wherein the tunnel is implemented using Generic Routing Encapsulation (GRE), a GPRS Tunneling Protocol (GTP) or Point-to-Point Tunneling Protocol (PPTP).

13. The network node of claim 9, wherein the processor is configured to configure a network layer in the reception protocol stack of the virtual network function with at least one of: a maximum transmission unit (MTU) size, or a maximum segment size (MSS) of data link layer protocol data units.

14. The network node of claim 12, wherein the segment offload request comprises the at least one of a maximum transmission unit (MTU) or maximum segment size (MSS) of data link layer protocol data units that are to be transmitted from the transmitting node to the network node.

15. The network node of claim 12, wherein the segment offload request comprises a suggested size of data link layer protocol data units that are to be transmitted from the transmitting node to the network node, and the processor is configured to select another size as said size of data link layer protocol data units and wherein the segmentation offload response comprises said other size to configure the transmitting node to tunnel network layer protocol data unit of said other size to the network node.

16. The network node of claim 9, wherein a network layer tunnelling protocol of the reception protocol stack of the virtual network function is adapted to receive network layer protocol data units tunneled from the transmitting node to the network node, wherein said network layer protocol data units encapsulate application data and are devoid of a transport layer header facilitating reliability of the data delivery between the network node and the transmitting node, and
wherein a transport layer protocol of the transmission protocol stack of the virtual network function is configured to segment and encapsulate the transport layer service data units for transmission to the receiving node via the transmission protocol stack of the virtual network function.

17. A home gateway implementing a network node according to claim 1.

18. A client node for registering a segmentation-offload at a network node, the client node comprising:
a processor and memory, wherein the processor is configured to execute operations to cause the client node to:
transmit a segmentation offload request to the network node connected to the client node via a network;
receive a segment offload response from the network node, the segment offload response comprising a tunnel endpoint identifier; and
configure, in response to the segment offload response, a network layer tunneling protocol of a transmission protocol stack provided by the client node to tunnel network layer protocol data units to the network node using the tunnel endpoint identifier, wherein said network layer protocol data units encapsulate application data and are devoid of a transport layer header facilitating reliability of the data delivery between the network node and the client node.

19. The client node of claim 18, wherein the segmentation offload request comprises an Internet protocol (IP) address or Fully-Qualified Domain Name (FQDN) of a receiving node.

20. The client node of claim 19, wherein the segmentation offload request further includes information on the IP address and port tuples of an established transport layer connection from the transmitting node to the receiving node, or wherein the processor is configured to establish a transport layer connection with the receiving node using the IP address or FQDN of the receiving node.

21. The client node of claim 18, wherein the segment offload request or the segment offload response comprises at least one of: a maximum transmission unit (MTU) size, or a maximum segment size (MSS) of data link layer protocol data units that are to be transmitted from the client node to the network node;
  wherein the processor is configured to provide transmission protocol stack, and to configure a network layer in the transmission protocol stack with the at least one of the MTU or MSS size of data link layer protocol data units.

22. The client node of claim 21, wherein the segment offload request comprises a suggested size of data link layer protocol data units that are to be tunneled from the transmitting node to the network node, and the segment offload response comprises another size as said size of data link layer protocol data unit;
  wherein the processor is configured to configure the data link layer in the reception protocol stack with said other size of data link layer protocol data units.

23. The client node of claim 18, wherein a data link layer of the transmission protocol stack ensures reliability by implementing an automatic repeat request mechanism.

* * * * *